United States Patent
Ito et al.

(10) Patent No.: US 11,265,313 B2
(45) Date of Patent: Mar. 1, 2022

(54) AUTHENTICATION CONTROL DEVICE AND AUTHENTICATION CONTROL METHOD

(71) Applicant: FUJITSU LIMITED, Kawasaki (JP)

(72) Inventors: Hidenobu Ito, Kawasaki (JP); Kazuaki Nimura, Kawasaki (JP); Yosuke Nakamura, Kawasaki (JP); Koichi Yasaki, Kawasaki (JP); Takuya Sakamoto, Kawasaki (JP); Tadanobu Tsunoda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 16/368,997

(22) Filed: Mar. 29, 2019

(65) Prior Publication Data
US 2019/0334889 A1    Oct. 31, 2019

(30) Foreign Application Priority Data

Apr. 25, 2018 (JP) .............................. JP2018-083752

(51) Int. Cl.
*H04L 29/06* (2006.01)
*B64C 39/02* (2006.01)

(52) U.S. Cl.
CPC ........ *H04L 63/0853* (2013.01); *B64C 39/024* (2013.01); *B64C 2201/146* (2013.01)

(58) Field of Classification Search
CPC ............... H04L 63/0853; B64C 39/024; B64C 2201/146
See application file for complete search history.

(56) References Cited

U.S. PATENT DOCUMENTS

2004/0107109 A1\*  6/2004  Nakanishi .......... H04N 21/2181
                                                              705/52
2007/0168674 A1   7/2007  Nonaka et al.
(Continued)

FOREIGN PATENT DOCUMENTS

JP    2016-115079    6/2016
JP    2018-049415    3/2018
(Continued)

OTHER PUBLICATIONS

JPOA—Office Action of Japanese Patent Application No. 2018-083752 dated Nov. 30, 2021 with Full Machine Translation.

*Primary Examiner* — Anthony D Brown
*Assistant Examiner* — Rodman Alexander Mahmoudi
(74) *Attorney, Agent, or Firm* — Fujitsu Patent Center

(57) ABSTRACT

An authentication control device includes one or more memories, and one or more processors coupled to the one or more memories and the one or more processor configured to perform storing of a first authentication key received from a server device in the one or more memories, the first authentication key relating to a second authentication key stored in a terminal of a user, in communication between the authentication control device and the terminal in the state where the authentication control device is uncommunicable with the server device, in response to receiving, from the terminal, first information encoded in accordance with the second authentication key, perform decoding of the first information by the stored first authentication key, and execute an authentication process of the user in accordance with second information acquired by the decoding.

15 Claims, 19 Drawing Sheets

(56) References Cited

U.S. PATENT DOCUMENTS

| | | | |
|---|---|---|---|
| 2014/0180914 A1 | 6/2014 | Abhyanker | |
| 2015/0154416 A1* | 6/2015 | Depinay | G06F 21/6245 726/28 |
| 2018/0285555 A1* | 10/2018 | Dong | H04L 9/0894 |
| 2019/0028443 A1* | 1/2019 | Chin | G07C 9/00571 |
| 2019/0116044 A1 | 4/2019 | Matsumoto | |

FOREIGN PATENT DOCUMENTS

| | | |
|---|---|---|
| JP | 2019-075721 | 5/2019 |
| WO | 2005/057447 A1 | 6/2005 |

\* cited by examiner

| APPLICATION ID | ID1 (FIRST IDENTIFICATION INFORMATION) | ID2 (SECOND IDENTIFICATION INFORMATION) |
|---|---|---|
| deliver.example.com | 294329d8ds8fad··· | fawi2323fa8a8··· |
| other.cxample.com | fas8wuhrdfa872··· | 32fawier8aso8··· |
| ⋮ | ⋮ | ⋮ |

| APPLICATION ID | AUTHENTICATION KEY (SECRET KEY) |
|---|---|
| deliver.example.com | KDwi24Sid3HA··· |
| other.cxample.com | Df1Usa9TSE8C··· |
| ⋮ | ⋮ |

| USER ID | NAME | BIRTH DATE | QUALIFICATION | TRANSPORT TARGET | POSITIONAL INFORMATION |
|---|---|---|---|---|---|
| 0001 | TARO YAMADA | 19740923 | PHARMACIST | DRUG A2 | ****** |
| 0002 | HANAKO FUJI | 19721023 | | | ****** |
| ... | ... | ... | ... | ... | ... |

| USER ID | AUTHENTICATION KEY (PUBLIC KEY) | EXPIRATION DATE | CHALLENGE |
|---|---|---|---|
| 0001 | IBHj3NBgkqG9··· | 2018.3.3.12:00:00 | |
| 0002 | AIsa2HIHF1ds··· | 2018.3.4.09:13:23 | 31824u988a··· |
| ... | ... | ... | ... |

| USER ID | AUTHENTICATION KEY (DUPLICATE KEY) | EXPIRATION DATE | CHALLENGE |
|---------|------------------------------------|-----------------|-----------|
| 0001 | IBHj3NBgkqG9··· | 2018.3.3.12:00:00 | 498jy76gh4 |
| ⋮ | ⋮ | ⋮ | ⋮ |

| APPLICATION ID | ID1 (FIRST IDENTIFICATION INFORMATION) | ID2 (SECOND IDENTIFICATION INFORMATION) |
|---|---|---|
| deliver.example.com | 294329d8ds8fad··· | fawi2323fa8a8··· |
| other.cxample.com | fas8wuhrdfa872··· | 32fawier8aso8··· |
| ⋮ | ⋮ | ⋮ |

FIG. 10A

| DESTINATION SSID | PASSCODE | EXPIRATION DATE |
|---|---|---|
| 0fa8f8urast8 | faifaiwe | 2018.3.3.12:00:00 |

| ENTRY NAME | DHCP SERVER |
|---|---|
| deliver.example.com | 192.168.1.10 |

| DEFAULT GW | DNS SERVER |
|---|---|
| 192.168.1.1 | 192.168.1.1 |

FIG. 10B

| DESTINATION SSID | PASSCODE | EXPIRATION DATE |
|---|---|---|
| 0fa8f8urast8 | faifaiwe | 2018.3.3.12:00:00 |

AUTHENTICATION CONTROL DEVICE AND AUTHENTICATION CONTROL METHOD

CROSS-REFERENCE TO RELATED APPLICATION

This application is based upon and claims the benefit of priority of the prior Japanese Patent Application No. 2018-83752, filed on Apr. 25, 2018, the entire contents of which are incorporated herein by reference.

FIELD

The embodiment discussed herein is an authentication control technique.

BACKGROUND

Internet of things (IoT) that enables connection of various things to the Internet has been known. For example, the technique of connecting a home delivery locker to a server on the Internet, and authenticating the user for unlocking of the home delivery locker via online authentication using a cloud service and a smartphone has been proposed. Fast identity online (FIDO) authentication is known as a protocol of the online authentication.

Related techniques are disclosed in Japanese Laid-open Patent Publication Nos. 2018-049415 and 2016-115079, description of U.S. Pat. No. 2014/0180914.

SUMMARY

According to an aspect of the embodiments, an authentication control device includes one or more memories, and one or more processors coupled to the one or more memories and the one or more processor configured to perform storing of a first authentication key received from a server device in the one or more memories, the first authentication key relating to a second authentication key stored in a terminal of a user, in communication between the authentication control device and the terminal in the state where the authentication control device is uncommunicable with the server device, in response to receiving, from the terminal, first information encoded in accordance with the second authentication key, perform decoding of the first information by the stored first authentication key, and execute an authentication process of the user in accordance with second information acquired by the decoding.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is a view illustrating an example of an ID storage part of the portable terminal;

FIG. 7B is a view illustrating an example of a secret key storage part;

FIG. 8A is a view illustrating an example of a user information storage part;

FIG. 8B is a view illustrating an example of a public key storage part;

FIG. 9A is a view illustrating an example of a duplicate key storage part;

FIG. 9B is a view illustrating an example of an ID storage part of the drone device;

FIG. 10A is a view illustrating an example of connection information set to a connection part;

FIG. 10B is a view illustrating an example of connection information set to a router part;

DESCRIPTION OF EMBODIMENTS

Since the home delivery locker is installed at a particular place, the home delivery locker may communicate with the server on the Internet and authenticate the user. In the case of a movable information processor such as a drone device, the information processor may not communicate with the server on the Internet and authenticate the user.

For example, at occurrence of a disaster, when a cargo such as relief goods are delivered using such information processor to a disaster area, it is required that the cargo is stored in a box and the box is locked, and avoid transferring the cargo to the third persons other than a valid user. In this case, at reception of the cargo, it is desirable to authenticate the user and then, unlock the box. However, according to the conventional art, in the disaster area, the information processor may be uncommunicable with the server due to a failure or damage of a communication facility, failing to authenticate the user.

Figure 1:
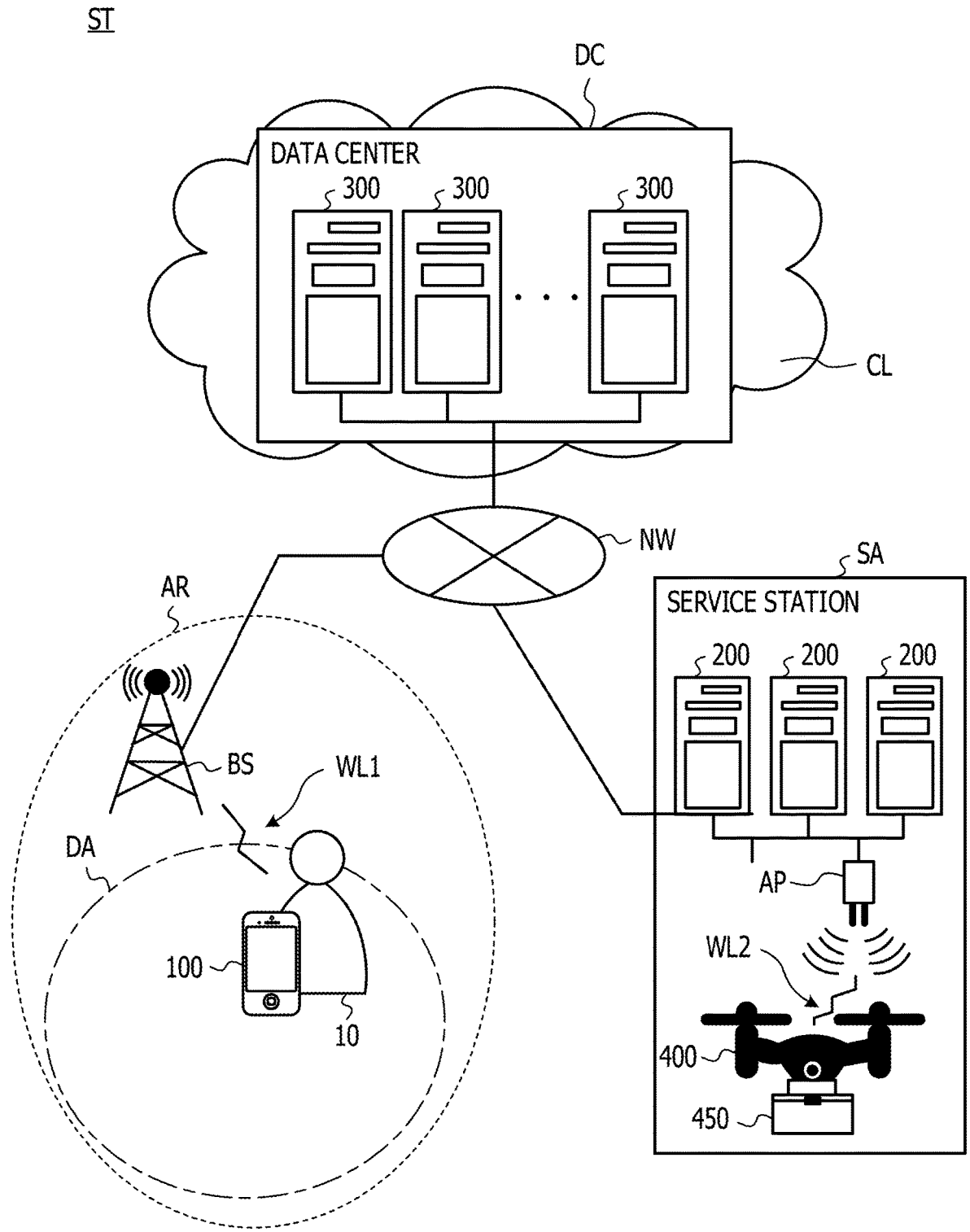
FIG. 1 is a view illustrating an example of an authentication control system.
Figure 2:
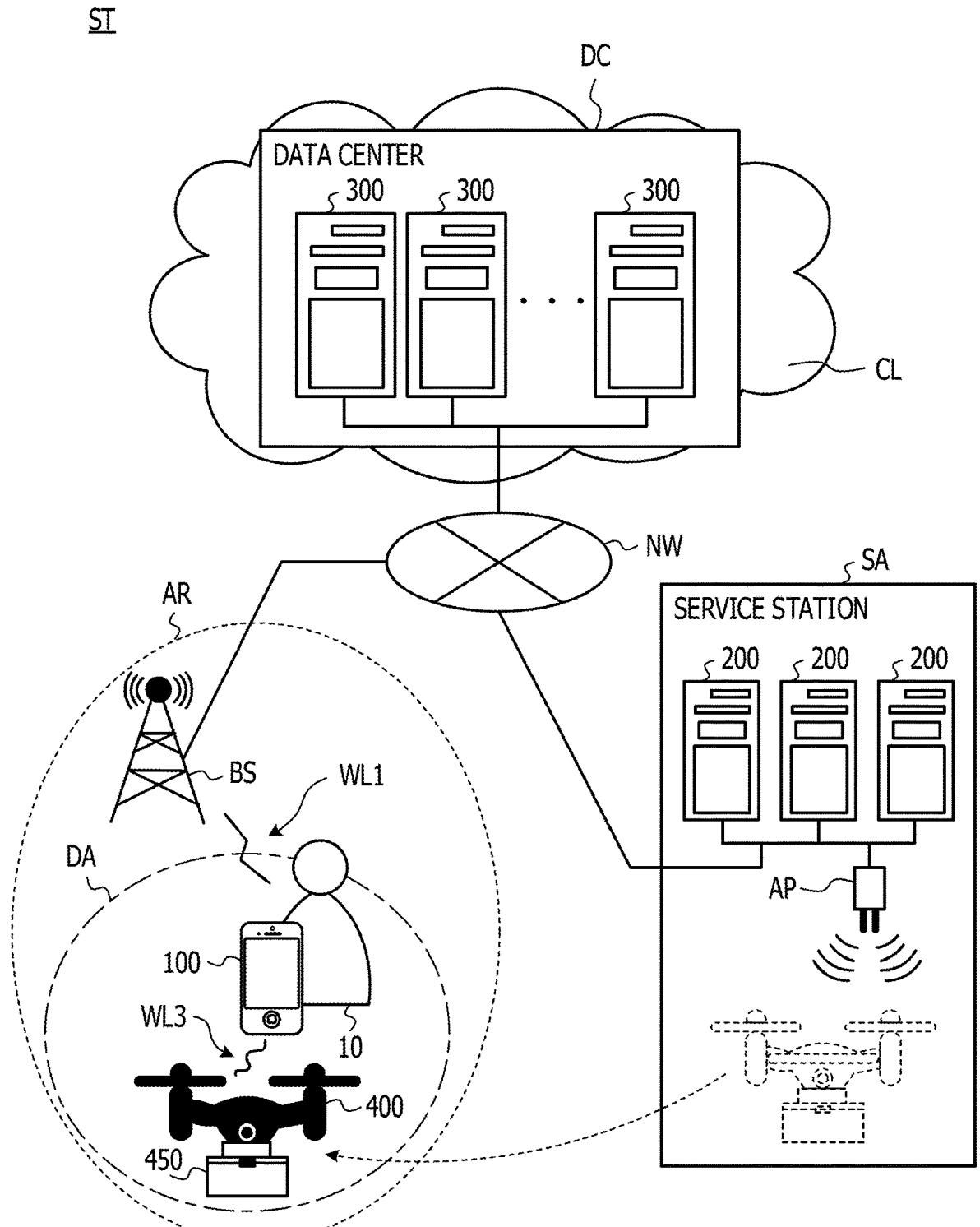
FIG. 2 is a view illustrating another example of the authentication control system.

FIG. 1 illustrates an example of an authentication control system ST. FIG. 2 illustrates another example of the authentication control system ST. As illustrated in FIGS. 1 and 2, the authentication control system ST includes a portable terminal 100, a service server 200, an authentication server 300, and a drone device 400.

The portable terminal 100 is an example of a terminal device, such as a smartphone, a tablet terminal, and a wearable terminal. The terminal device may be a notebook personal computer (PC) having an internal or external biometric authentication sensor. The service server 200 is a server device managed by a first provider that offers a cargo transport service. The service server 200 is installed, for example, at a service station SB managed by the first provider. Examples of the service station SB include a roof of a facility and a parking lot that are used by the first provider.

The authentication server 300 is a server device managed by a second provider that offers a cloud service of online authentication. Accordingly, the authentication server 300 is installed on a cloud CL (specifically, in a data center DC). As described above, since the first provider and the second provider are different providers, for example, the second provider is inaccessible to user information managed by the first provider. The drone device 400 is an example of a mobile information processor. The drone device 400 may be referred to as a multicomputer or an unmanned aircraft. In this embodiment, the mobile information processor is not limited to a movable body such as the drone device 400, and may be a movable body, for example, moving on the ground or water surface. Examples of such movable body include vehicles, ships, and robots. A notebook PC having a biometric authentication function may be mounted in a vehicle, ship, or flight vehicle to constitute the mobile information processor.

The portable terminal 100, the service server 200, and the authentication server 300 are interconnected via a communication network NW. In particular, the portable terminal 100 is connected to the service server 200 and the authentication server 300 via a portable base station BS and the communication network NW. Accordingly, if the portable terminal 100 is included in a communicable area AR of the portable base station BS, as illustrated in FIG. 1, the portable terminal 100 may communicate with the portable base station BS by wireless communication WL1. Thereby, even when a user 10 of the transport service is located in a disaster area DA that is a different place from the service station SB, the portable terminal 100 of the user 10 may communicate with the service server 200 and the authentication server 300. An example of the communication network NW is the Internet. An example of the wireless communication WL1 is a wide-area wireless communication such as long term evolution (LTE).

Here, as illustrated in FIG. 1, when the user 10 operates the portable terminal 100 to request a cargo transport to the service server 200, the service server 200 sets various connection information about communicative connection to the drone device 400. Describing in more detail, the service server 200 uses wireless communication WL2 at an access point AP installed in the service station SB to set the various connection information. Examples of the wireless communication WL2 include near-field wireless communication such as Wi-Fi (registered trademark) and Bluetooth (registered trademark).

As illustrated in FIG. 1, when the portable terminal 100 requests the service server 200 to transport the cargo, the authentication server 300 registers various authentication information about authentication of the user 10 to the drone device 400 under the control of the service server 200. The authentication server 300 also registers the various authentication information by the wireless communication WL2.

Although other details will be described later, to avoid spoofing, the portable terminal 100 and the drone device 400 generate and exchange respective identification information. When setting of the connection information, the registration of the authentication information, and the exchange of the identification information are completed, the operator who operates in the service station SB stores the cargo requested by the user 10 in a transport box 450 of the drone device 400, and locks the transport box 450. The operator accesses the service server 200 via an operation screen (not illustrated) of the drone device 400, sets positional information about the user 10 to a destination, and causes the drone device 400 to fly. Thereby, the drone device 400 is transferred from the service station SB to the user 10 located in the disaster area DA. At request of cargo transport, the positional information about the user 10 is transmitted from the portable terminal 100 to the service server 200.

As illustrated in FIG. 2, when the drone device 400 arrives at the position of the user 10, the drone device 400 authenticates the user 10. Specifically, first, when the user 10 brings the portable terminal 100 closer to the drone device 400, the portable terminal 100 starts communication by wireless communication WL3, and requests connection to the drone device 400. An example of the wireless communication WL3 is proximity wireless communication such as near field communication (NFC). After that, the portable terminal 100 and the drone device 400 transmit respective identification information each other, and confirm whether or not the transmitted identification information coincides the held identification information. The NFC uses an NFC code (for example, QR code (registered trademark)) and an NFC reader (for example, QR code (registered trademark) scanner). When the portable terminal 100 displays the NFC code, and the NFC reader of the drone device 400 reads the NFC code, the portable terminal 100 starts communication with the drone device 400.

When the two pieces of identification information coincide with each other, the portable terminal 100 may determine that the drone device 400 corresponds to the requested drone device 400, and the drone device 400 may determine that the portable terminal 100 corresponds to the requesting portable terminal 100. In this manner, mutual spoofing of portable terminal 100 and the drone device 400 may be reduced. When the two pieces of identification information do not coincide with each other, the drone device 400 shuts off communication with the portable terminal 100.

When the two pieces of identification information coincide with each other, the drone device 400 allows connection to the portable terminal 100, establishes a communication channel to the portable terminal 100, and keeps the communication channel. Using the connection information set from the service server 200, the drone device 400 establishes a path to the authentication information registered in the drone device 400. Then, the drone device 400 generates a challenge and transmits the challenge to the portable terminal 100, and the portable terminal 100 encodes the challenge using the own authentication information and returns the encoded challenge. The challenge is information formed by unintentionally (randomly) combining at least one character, at least one figure, and at least one sign. The drone device 400 decodes the encoded challenge using the own authentication information and compares the decoded challenge with the challenge transmitted by itself to verify a comparison result.

When confirming the coincidence of the challenges, the drone device 400 determines that the user 10 is a valid user, and unlocks the transport box 450. This enables the user 10 to take out the cargo from the transport box 450. The type of the cargo is not specifically limited as long as it can be stored in the transport box 450 and the drone device 400 carrying the cargo can fly. Hereinafter, a drug is described as an example of the cargo. However, the cargo may be foods and luxuries in addition to relief goods.

Details of the authentication control system ST will be described below.

Figure 3:
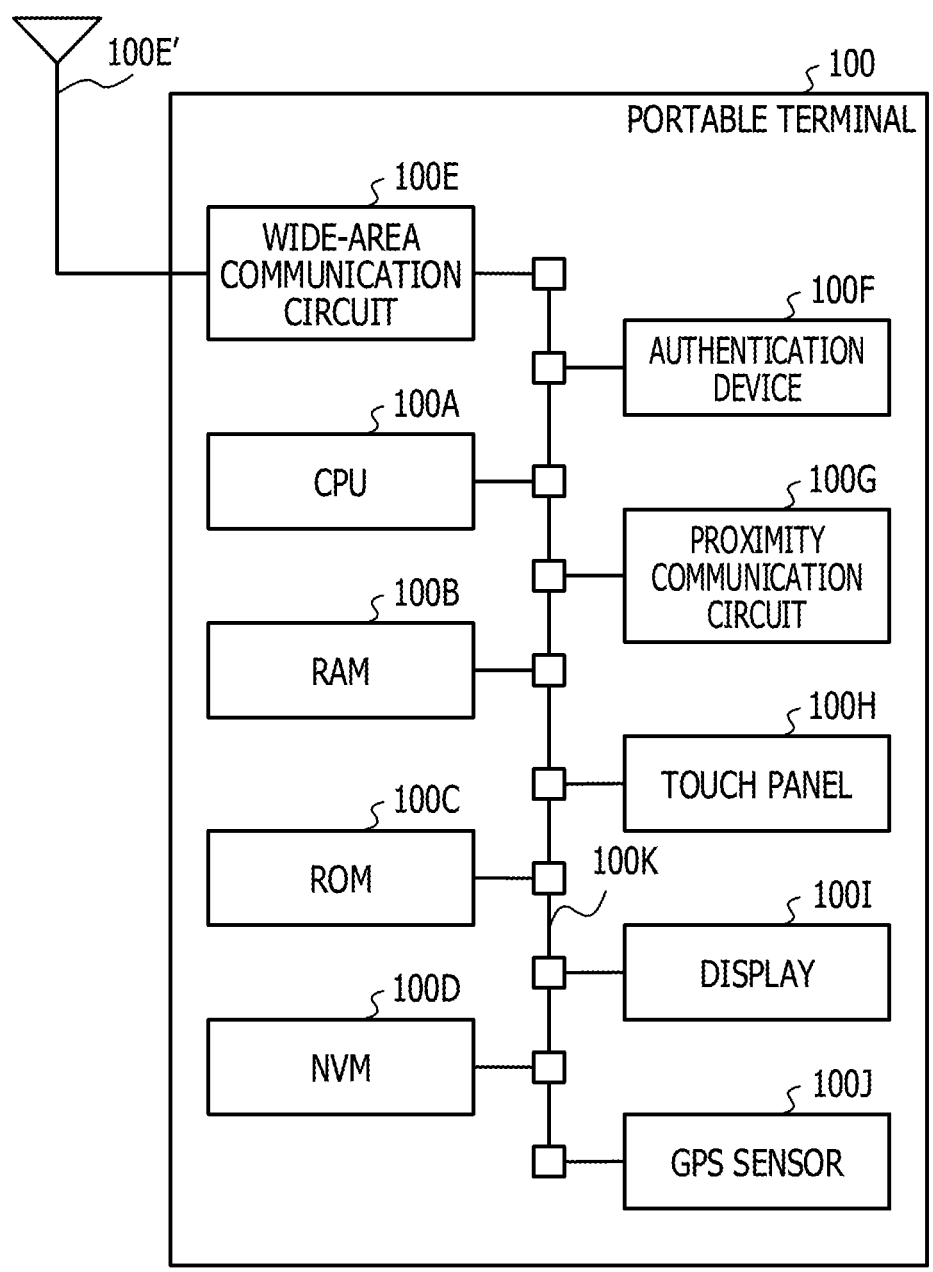
FIG. 3 is a view illustrating an example of the hardware configuration of a portable terminal.

FIG. 3 illustrates an example of the hardware configuration of the portable terminal 100. As illustrated in FIG. 2, the portable terminal 100 includes a central processing unit (CPU) 100A that is a hardware processor, a random access memory (RAM) 100B, a read only memory (ROM) 100C, a non-volatile memory (NVM) 100D, and a wide-area communication circuit 100E. The wide-area communication circuit 100E is a hardware circuit implementing the wide-area wireless communication. An antenna 100E' is connected to the wide-area communication circuit 100E.

The portable terminal 100 includes an authentication device 100F, a proximity communication circuit 100G, a touch panel 100H, a display 100I, and a global positioning system (GPS) sensor 100J. The portable terminal 100 may include a camera, a speaker, and a microphone. Here, the authentication device 100F stores a biometric authentication sensor and biometric information that identifies the user 10. The biometric authentication sensor may use face, fingerprint, and iris as an authenticated target. However, the authenticated target is not specifically limited, and may be vein and palm. The proximity communication circuit 100G is a hardware circuit implementing proximity wireless communication. The GPS sensor 100J may identify the position of the user 10 who holds the portable terminal 100. The CPU 100A to the GPS sensor 100J are interconnected via an internal bus 100K. In place of the CPU 100A, a micro processing unit (MPU) may be used as a hardware processor.

The CPU 100A temporarily stores programs stored in the ROM 100C and the NVM 100D in the above-mentioned RAM100B. The CPU 100A executes the program including a plurality of commands to implement below-mentioned various functions and execute below-mentioned various processing. The program may be selected according to below-mentioned processing sequence diagrams.

Figure 4:
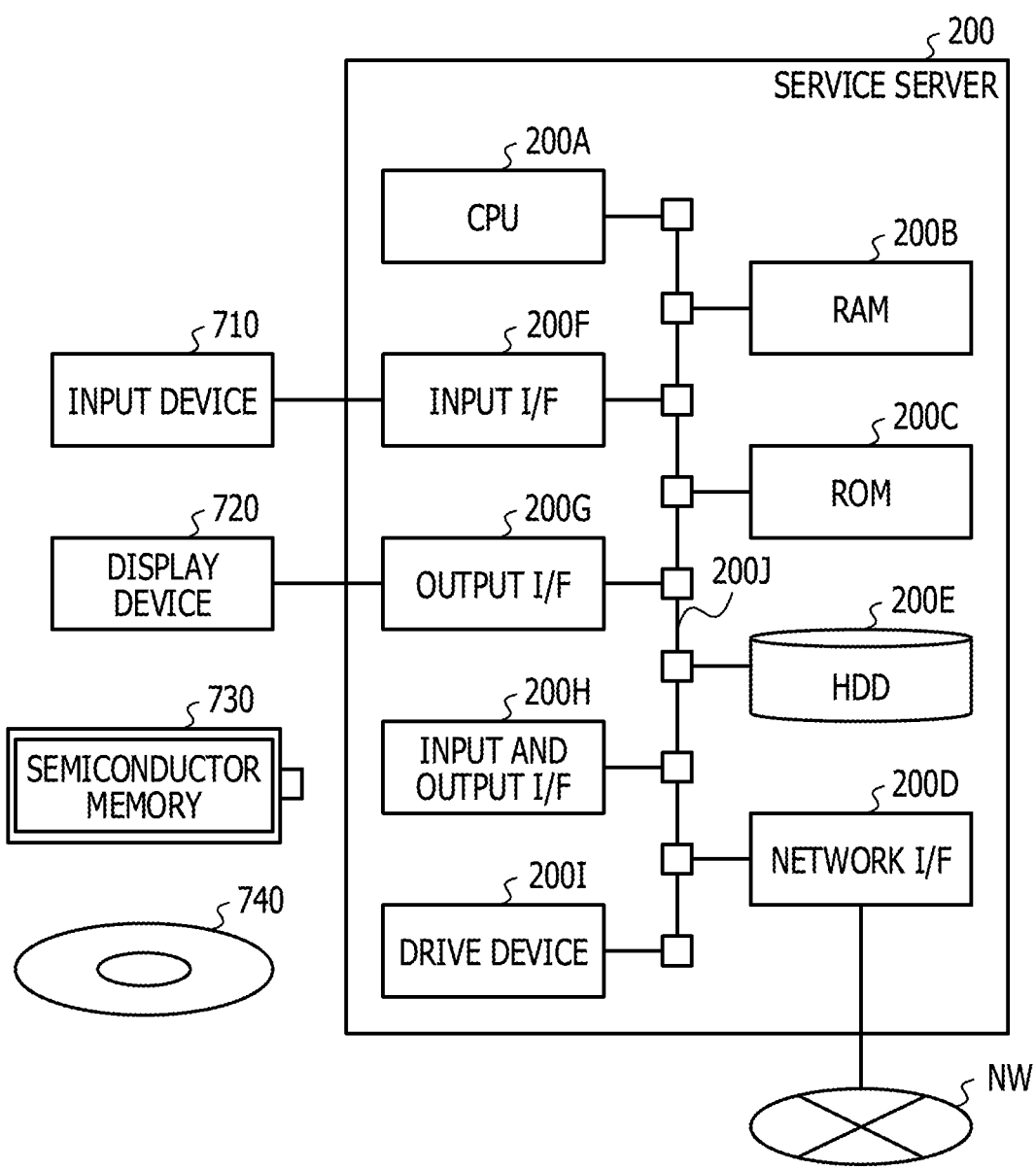
FIG. 4 is a view illustrating an example of the hardware configuration of a service server.

FIG. 4 illustrates an example of the hardware configuration of the service server 200. The above-mentioned authentication server 300 has the basically same hardware configuration as the hardware configuration of the service server 200 and thus, description thereof is omitted. As illustrated in FIG. 4, the service server 200 includes at least a CPU 200A that is a hardware processor, a RAM 200B, a ROM 200C, and a network I/F (interface) 200D. In place of the CPU 200A, an MPU may be used as a hardware processor. As appropriate, the service server 200 may include at least one of a hard disk drive (HDD) 200E, an input I/F 200F, an output I/F 200G, an input and output I/F 200H, and a drive device 200I. The CPU 200A to the drive device 200I are interconnected via an internal bus 200J.

An input device 710 is connected to the input I/F 200F. Examples of the input device 710 include a keyboard and a mouse. A display device 720 is connected to the output I/F 200G. An example of the display device 720 is a liquid crystal display. A semiconductor memory 730 is connected to the input and output I/F 200H. Examples of the semiconductor memory 730 include a Universal Serial Bus (USB) memory and a flash memory. The input and output I/F 200H reads programs and data in the semiconductor memory 730. The input I/F 200F and the input and output I/F 200H each have, for example, an USB port. The output I/F 200G has, for example, a display port.

A portable recording medium 740 is inserted into the drive device 200I. Examples of the portable recording medium 740 include removable discs such as compact disc (CD)-ROM and digital versatile disc (DVD). The drive device 200I reads programs and data in the portable recording medium 740. The network I/F 200D has, for example, a LAN port. The network I/F 200D is connected to the above-mentioned communication network NW.

The CPU 200A temporarily stores the programs stored in the ROM 200C and the HDD 200E in the above-mentioned RAM 200B. The CPU 200A temporarily stores a program stored in the portable recording medium 740 in the RAM 200B. The CPU 200A executes the program including a plurality of commands to implement below-mentioned various functions and execute below-mentioned various processing. The program may be selected according to below-mentioned processing sequence diagrams.

Figure 5:
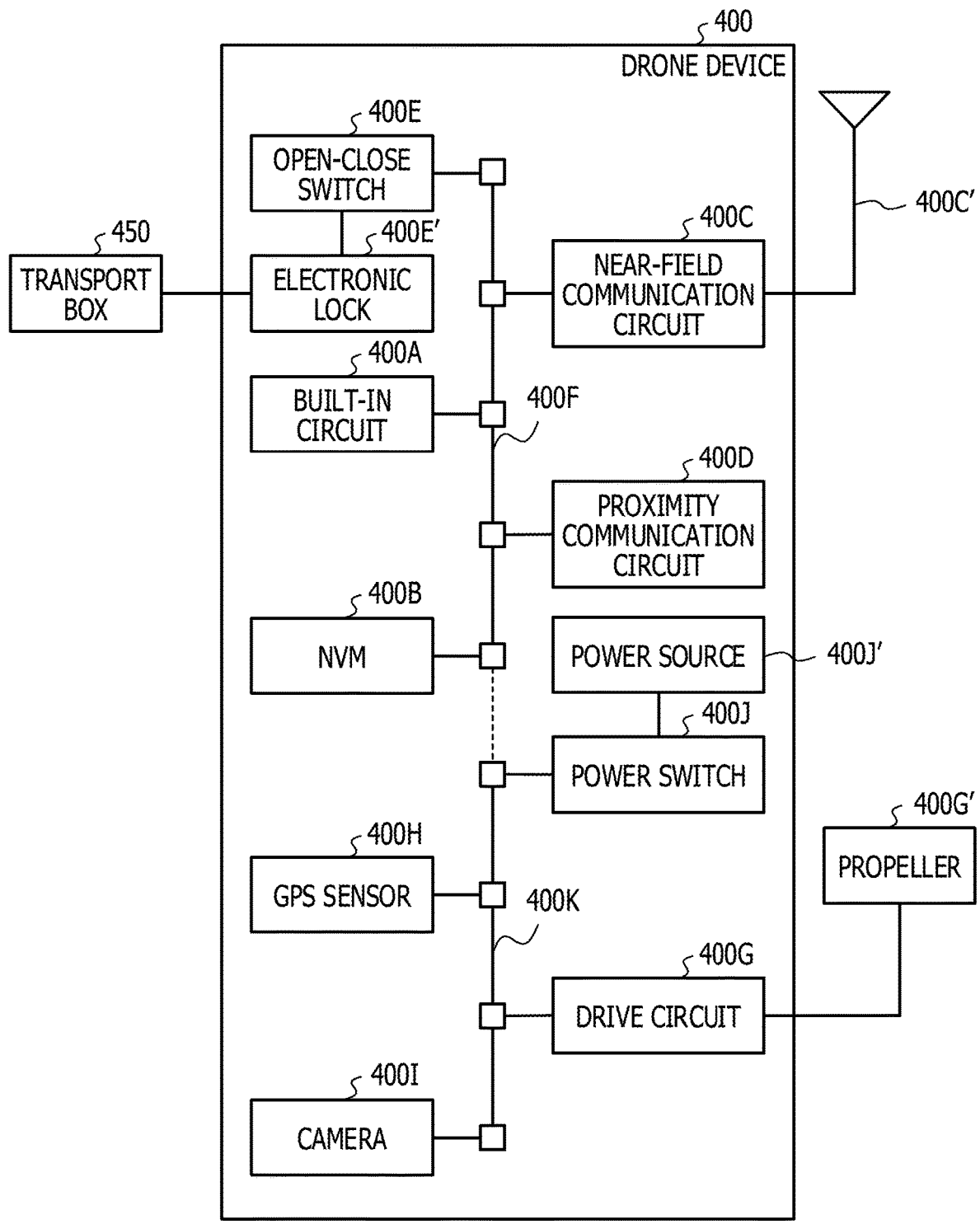
FIG. 5 is a view illustrating an example of the hardware configuration of a drone device.

FIG. 5 illustrates an example of the hardware configuration of the drone device 400. As illustrated in FIG. 5, the drone device 400 includes a built-in circuit 400A, an NVM 400B, a near-field communication circuit 400C, a proximity communication circuit 400D, and an open-close switch 400E. The built-in circuit 400A is a hardware circuit including a CPU, a RAM, a ROM, and so on. The built-in circuit 400A is detachable from the drone device 400. An antenna 400C' is connected to the near-field communication circuit 400C. The open-close switch 400E is connected to an electronic lock 400E' of the transport box 450 to lock or unlock the electronic lock 400E'. The open-close switch 400E may be implemented by a relay circuit. The built-in circuit 400A to the open-close switch 400E are interconnected via a first internal bus 400F. That is, the drone device 400 may be implemented by a computer.

The drone device 400 includes a drive circuit 400G, a GPS sensor 400H, a camera 400I, and a power switch 400J. The drive circuit 400G to the power switch 400J are interconnected via a second internal bus 400K. Here, the drive circuit 400G is a hardware circuit for driving a propeller 400G'. The drive circuit 400G and the propeller 400G' are examples of a drive part. The power switch 400J is a hardware circuit for switching a destination of electric power supplied from a power source 400J' such as a battery. When detecting that the drive circuit 400G stops driving of the propeller 400G', the power switch 400J switches the destination of electric power from the second internal bus 400K to the first internal bus 400F. This may reduce power consumption of the power source 400J'. The power switch 400J and the power source 400J' are examples of a supply part.

Since the drone device 400 in accordance with this embodiment includes no wide-area communication circuit, the drone device 400 may not use the wireless communication WL1. For this reason, when the drone device 400 falls outside the communicable area of the access point AP, the drone device 400 may not use the Internet. As a result, the drone device 400 may not access the authentication server 300, failing to perform online authentication using the authentication server 300.

Figure 6:
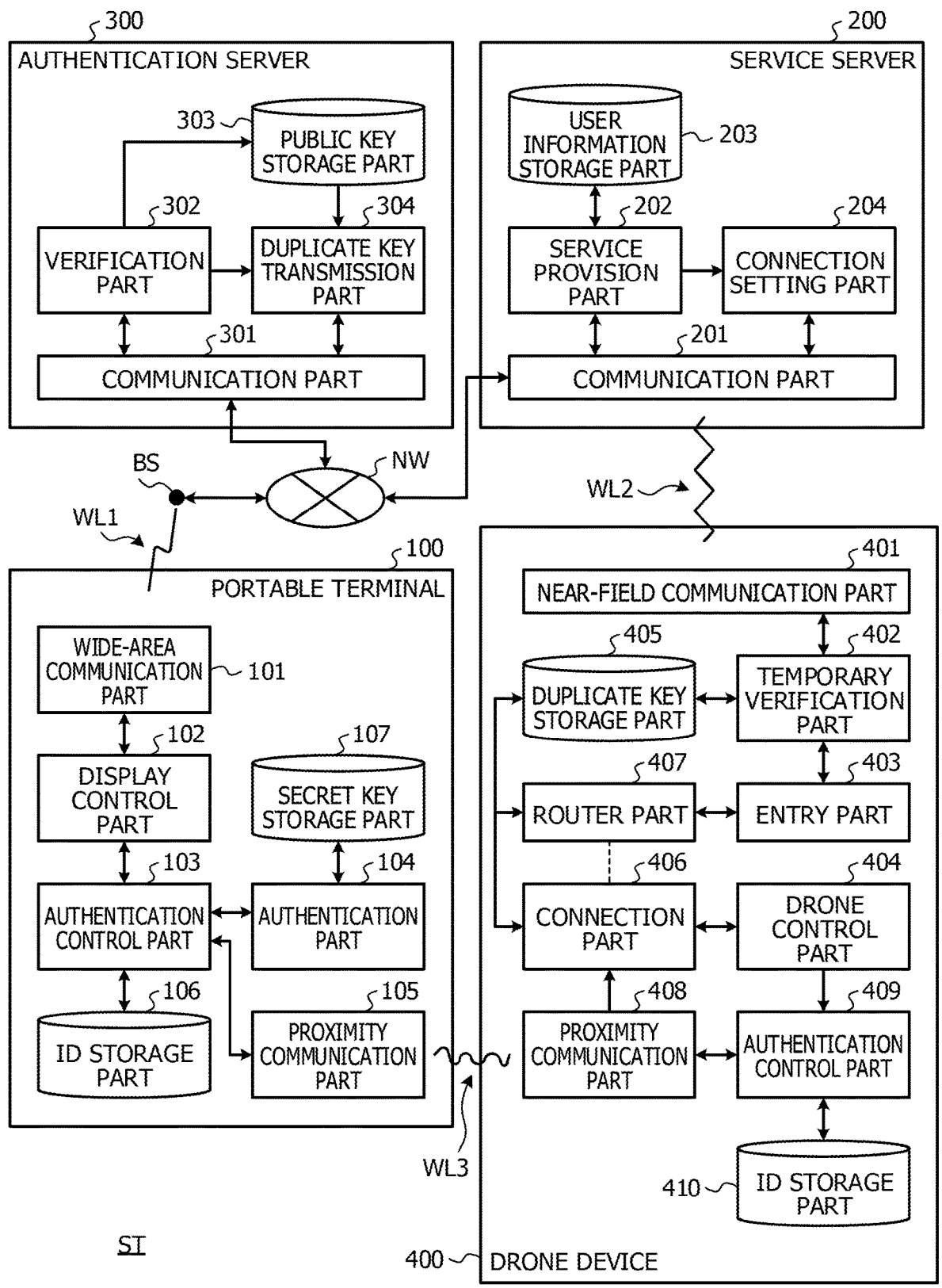
FIG. 6 is a block diagram illustrating an example of the authentication control system.

FIG. 6 is a block diagram illustrating an example of the authentication control system ST.

First, the portable terminal 100 will be described. The portable terminal 100 includes a wide-area communication part 101, a display control part 102, an authentication control part 103, an authentication part 104, a proximity communication part 105, an ID storage part 106, and a secret key storage part 107. The wide-area communication part 101 may be implemented by the above-mentioned wide-area communication circuit 100E and antenna 100E'. The display control part 102 may be implemented by causing the above-mentioned CPU 100A to execute an application program (hereinafter referred to as service application) including a plurality of commands distributed from the service server 200. The authentication control part 103 may be implemented by causing the above-mentioned CPU 100A to execute a client application program (hereinafter referred to as authentication client) including a plurality of commands pursuant to FIDO authentication. The authentication part 104 may be implemented by the above-mentioned authentication device 100F. The proximity communication part 105 may be implemented by the above-mentioned proximity communication circuit 100G. The ID storage part 106 and the secret key storage part 107 may be implemented by the RAM 100B or the NVM 100D.

The wide-area communication part 101 controls wide-area wireless communication between the portable terminal 100, and the service server 200 and the authentication server 300. For example, the wide-area communication part 101 transmits various information outputted from the display control part 102 to the service server 200 and the authentication server 300. The wide-area communication part 101 receives the various information transmitted from the service server 200 and the authentication server 300, and outputs the information to the display control part 102.

The display control part 102 displays the service provided from the service server 200 on the display 100I (see FIG. 3). For example, when the user 10 operates the touch panel 100H (see FIG. 3), the display control part 102 displays various screens such as a first service screen for accepting a request of service and a second service screen for selecting a drug. According to the accepted operation, the display control part 102 transmits various instruction information (commands) to the wide-area communication part 101 and the authentication control part 103.

The authentication control part 103 controls the entire authentication operations of the portable terminal 100, including intermediation between the display control part 102 and the authentication part 104. In response to a request from the authentication server 300, the authentication control part 103 transmits an authentication registration request to register the authentication information to the authentication part 104. The authentication control part 103 generates first identification information for temporarily identifying the portable terminal 100, and saves the generated first identification information in the ID storage part 106 as well as the first identification information that is common to (or same as) the generated first identification information to the authentication part 104. In particular, when saving the first identification information, the authentication control part 103 associates the first identification information with second identification information that temporarily identify an application ID and the drone device 400. The application ID is uniform resource locator (URL) of the service server 200 distributing the service application. Thereby, as illustrated in FIG. 7A, the ID storage part 106 stores the first identification information associated with the application ID and the second identification information. The first identification information and the second identification information each are information formed by unintentionally (randomly) combining at least one character, at least one number, and at least one sign. The first identification information, the second identification information, and the above-mentioned challenge are different from one another.

When receiving the authentication registration request from the authentication control part 103, the authentication part 104 displays a biometric authentication screen on the display 100I (see FIG. 3). When receiving an identity confirmation request for identifying the user 10 from the authentication control part 103, the authentication part 104 displays the biometric authentication screen on the display 100I (see FIG. 3). For example, in the case of iris authentication, the authentication part 104 displays the biometric authentication screen including a message to promote iris authentication.

The authentication part 104 acquires the iris of the user 10 as biometric information, and compares the acquired biometric information with pre-registered biometric information to identify the user 10. When the identification of the user 10 succeeds, the authentication part 104 generates a pair of a secret key and a public key having an expiration date as an authentication key for encoding information, and saves the secret key in the secret key storage part 107. In particular, in saving the secret key, the authentication part 104 associates the secret key with the application ID and saves the secret key. Thereby, as illustrated in FIG. 7B, the secret key storage part 107 stores the secret key associated with the application ID.

The authentication part 104 encodes the first identification information transmitted from the authentication control part 103 using the secret key to generate an electronic signature, and transmits a user ID identifying the user 10, the public key, and the electronic signature to the authentication server 300. The user ID, the public key, and the electronic signature arrive at the service server 200 from the authentication part 104 via the authentication control part 103, the display control part 102, the wide-area communication part 101, the portable base station BS, and the communication network NW. The service server 200 transmits the user ID, the public key, and the electronic signature to the drone device 400. The service server 200 transmits the user ID and the public key to the authentication server 300 without transmitting the electronic signature to the authentication server 300. Thereby, the public key arrives at the authentication server 300. In this embodiment, the public key cryptography is used and however, secret key cryptography may be used.

The proximity communication part 105 communicates with a below-mentioned proximity communication part 408 of the drone device 400, and acquires the first identification information held by the drone device 400. As described above, the first identification information is information for temporarily identifying the portable terminal 100. The proximity communication part 105 transmits the second identification information held by the portable terminal 100 to the drone device 400. As described above, the second identification information is information for temporarily identifying the drone device 400. When acquiring the first identification information, the proximity communication part 105 transmits the acquired first identification information to the authentication control part 103. Thereby, the authentication control part 103 may compare the first identification information stored in the ID storage part 106 with the acquired first identification information to verify a comparison result.

Next, the service server 200 will be described. The service server 200 includes a communication part 201, a service provision part 202, a user information storage part 203, and a connection setting part 204. The communication part 201 may be implemented by the above-mentioned network I/F 200D. The service provision part 202 and the connection setting part 204 may be implemented by causing the above-mentioned CPU 100A to execute the application program providing the transport service. The user information storage part 203 may be implemented by the RAM 200B or the HDD 200E.

The communication part 201 controls communication between the service server 200, and the portable terminal 100, the authentication server 300, and the drone device 400. For example, the communication part 201 transmits various information to the portable terminal 100, the authentication server 300, and the drone device 400. The communication part 201 receives the various information transmitted from the portable terminal 100, the authentication server 300, and the drone device 400.

The service provision part 202 manages the service application, and when the communication part 201 accepts distribution of the service application from the portable terminal 100, the service provision part 202 distributes the service application to the portable terminal 100. The service provision part 202 manages a first Web page for accepting the drug transport service and a second Web page for selecting drugs. When the communication part 201 accepts a viewing request of the first Web page, the service provision part 202 distributes the first Web page, and when the communication part 201 accepts the viewing request of the second Web page, the service provision part 202 distributes the second Web page.

The user information storage part 203 stores user information. As illustrated in FIG. 8A, the user information includes various attributes including user ID, name, positional information, birth data, sex, and qualification of the user 10. For example, when the user 10 requests drug transport, the service provision part 202 checks the user information storage part 203 to determine whether or not the user 10 is qualified to deal with a drug to be transported.

When accepting a transport request transmitted from the service provision part 202, under the control of the service provision part 202, the connection setting part 204 sets various connection information about communicative connection to the drone device 400. Describing in more detail, the connection setting part 204 outputs the connection information to the communication part 201, and the communication part 201 transmits the connection information to the drone device 400. Although details will be described later, the connection information includes a service set identifier (SSID), a passcode (or password), an expiration date, URLK of the service server 200, an IP address of a dynamic host configuration protocol (DHCP) server, an IP address of default gateway (GW), an IP address of a domain name system (DNS), and so on.

Next, the authentication server 300 will be described. The authentication server 300 includes a communication part 301, a verification part 302, a public key storage part 303, and a duplicate key transmission part 304. The communication part 201 may be implemented by the above-mentioned network I/F 200D. The verification part 302 and the duplicate key transmission part 304 may be implemented by causing the above-mentioned CPU 100A to execute the application program provided by the online authentication service. The public key storage part 303 may be implemented by the RAM 200B or the HDD 200E.

The communication part 301 controls communication between the authentication server 300, and the portable terminal 100, the service server 200, and the drone device 400. For example, the communication part 301 transmits various information to the portable terminal 100, the service server 200, and the drone device 400. The communication part 301 receives the various information transmitted from the portable terminal 100, the service server 200, and the drone device 400.

When the communication part 301 receives a public key via the service server 200, the verification part 302 saves the public key in the public key storage part 303. Thereby, as illustrated in FIG. 8B, the public key storage part 303 stores the public key. In particular, the public key is associated with the user ID. However, since it is based on the authentication registration request, at this time, the challenge is not associated. In the case where the identity of the user 10 is confirmed using the pre-registered public key, the verification part 302 generates the challenge, associates the generated challenge with the public key, and saves them.

In response to a transmission instruction from the verification part 302, the duplicate key transmission part 304 acquires a public key of a target user from the public key storage part 303, duplicates the public key, and transmits the duplicated public key as a duplicate key to the drone device 400. Describing in more detail, the duplicate key transmission part 304 outputs the duplicated public key to the communication part 301, and the communication part 301 transmits the duplicated public key to the drone device 400.

Next, the drone device 400 will be described. The drone device 400 includes a near-field communication part 401, a temporary verification part 402, an entry part 403, a drone control part 404, and a duplicate key storage part 405 as constituents. In particular, the drone control part 404 includes an authentication processing part for executing authentication processing of authenticating the user 10 and a non-authentication processing part for executing non-authentication processing other than the authentication processing. The non-authentication processing is processing of controlling the open-close switch 400E and the drive circuit 400G. The drone device 400 includes a connection part 406, a router part 407, a proximity communication part 408, an authentication control part 409, and an ID storage part 410 as constituents as constituent. The temporary verification part 402 and the drone control part 404 are examples of a processing part and however, the processing part may include any constituent other than the temporary verification part 402 and the drone control part 404. The duplicate key storage part 405 is an example of a storage part and however, the storage part may include any constituent other than the duplicate key storage part 405.

The near-field communication part 401 may be implemented by the above-mentioned near-field communication circuit 400C. The proximity communication part 408 may be implemented by the above-mentioned proximity communication circuit 400D. The temporary verification part 402, the entry part 403, the drone control part 404, the duplicate key storage part 405, the connection part 406, the router part 407, the authentication control part 409, and the ID storage part 410 may be implemented by the built-in circuit 400A and the NVM 400B.

In particular, the authentication processing part of the drone control part 404 may be implemented by causing the CPU of the built-in circuit 400A to execute the program including a plurality of commands, which is stored in the ROM of the built-in circuit 400A. The non-authentication processing part of the drone control part 404 may be implemented by causing the CPU of the built-in circuit 400A to execute the program stored in the NVM 400B. As described above, since the authentication processing part of the drone control part 404 is implemented by the program stored in the ROM, it is difficult to change contents of the program, for example, change an access destination.

The non-authentication processing part of the drone control part 404 is implemented by the program stored in the NVM 400B. For this reason, while the drone device 400 stays in the service station SB, the NVM 400B may receive a control program limited to the service from the service server 200, thereby limiting functions of the drone device 400. For example, the drone device 400 may be safely operated by changing the functions of the drone device 400 or limiting the use of unnecessary functions according to the control program.

The near-field communication part 401 controls communication between the drone device 400, and the service server 200 and the authentication server 300. For example, according the type of information, the near-field communication part 401 transmits various information to the service server 200 or the authentication server 300. The near-field communication part 401 receives the various information transmitted from the service server 200 and the authentication server 300.

When the near-field communication part 401 receives the public key and the electronic signature from the service server 200, the temporary verification part 402 outputs the public key and the electronic signature to the authentication control part 409. When the near-field communication part 401 receives the user ID and the duplicate key from the authentication server 300, the temporary verification part 402 saves the user ID and the duplicate key in the duplicate key storage part 405. Thereby, as illustrated in FIG. 9A, the duplicate key storage part 405 stores the duplicate key. Immediately after the saving, the challenge is not associated with the duplicate key. To confirm the identity of the user 10, the temporary verification part 402 generates the challenge, associates the generated challenge with the duplicate key, and saves them. Basically, the functions of the temporary verification part 402 are common to the functions of the verification part 302 of the authentication server 300.

In response to a request from the drone control part 404, the entry part 403 requests the temporary verification part 402 to confirm the identity of the user 10, or to delete the duplicate key. Basically, functions of the entry part 403 are common to the functions of the service server 200.

The drone control part 404 authenticates the user 10. For example, when the drone control part 404 is allowed to be connected to the entry part 403 by the connection part 406, the drone control part 404 transmits various information to the entry part 403 via the connection part 406 and the router part 407. When the drone control part 404 is allowed to be connected to the entry part 403 by the connection part 406, the drone control part 404 receives various information from the entry part 403 via the router part 407 and the connection part 406. The drone control part 404 authenticates the user 10 through transmission and reception of the various information. When the drone device 400 stops its flying, the drone control part 404 switches the power switch 400J (see FIG. 5) from the second internal bus 400K (see FIG. 5) to the first internal bus 400F (see FIG. 5). When succeeding authentication of the user 10, the drone control part 404 unlocks the open-close switch 400E (see FIG. 5).

The router part 407 is an access point to be referred to by the connection part 406. When the near-field communication part 401 receives connection information, the router part 407 acquires and holds the received connection information. Thereby, the connection information is set to the router part 407. As illustrated in FIG. 10A, the connection information held by the router part 407 includes the SSID, the passcode, the expiration date, the URL, the IP address of the DHCP server, the IP address of the default GW, and the IP address of the DNS server. That is, the connection information includes various information required to set the channel.

When the near-field communication part 401 receives connection information, the connection part 406 acquires and holds a part of the received connection information. Thereby, the connection information is set to the connection part 406. For example, when the connection information received by the near-field communication part 401 indicates connection to the router part 407 as illustrated in FIG. 10B, the connection part 406 is connected to the router part 407 by wired communication or wireless communication. When the connection information received by the near-field communication part 401 indicates connection to the access point AP, the connection part 406 is connected to the near-field communication part 401. Thereby, the access point AP of the service station SB is connected to the drone device 400 by the wireless communication WL2. In this manner, based on the connection information, the connection part 406 changes the access destination and is connected thereto.

The proximity communication part 408 communicates with the proximity communication part 105 of the portable terminal 100, and acquires the second identification information held by the portable terminal 100. The proximity communication part 408 transmits the first identification information held by the drone device 400 to the portable terminal 100. When acquiring the second identification information, the proximity communication part 408 transmits the acquired second identification information to the authentication control part 409. Thus, the authentication control part 409 may compare the second identification information stored in the ID storage part 410 with the acquired second identification information, and verify the comparison result.

The authentication control part 409 controls the entire authentication operations of the drone device 400, such as intermediation between the drone control part 404 and the proximity communication part 408. When receiving the public key and the electronic signature from the temporary verification part 402, the authentication control part 409 decodes the electronic signature using the public key to restore the first identification information and then, generates the second identification information. The authentication control part 409 associates the decoded first identification information with the generated second identification information, and saves them in the ID storage part 410 and then, transmits the second identification information that is common to (or the same as) the generated second identification information to the drone control part 404. In particular, in saving the second identification information, the authentication control part 409 associates the first identification information and the second identification information with the application ID, and saves them. In this manner, as illustrated in FIG. 9B, the ID storage part 410 stores the first identification information and the second identification information that are associated with the application ID.

Next, operations of the authentication control system ST will be described.

Figure 11:
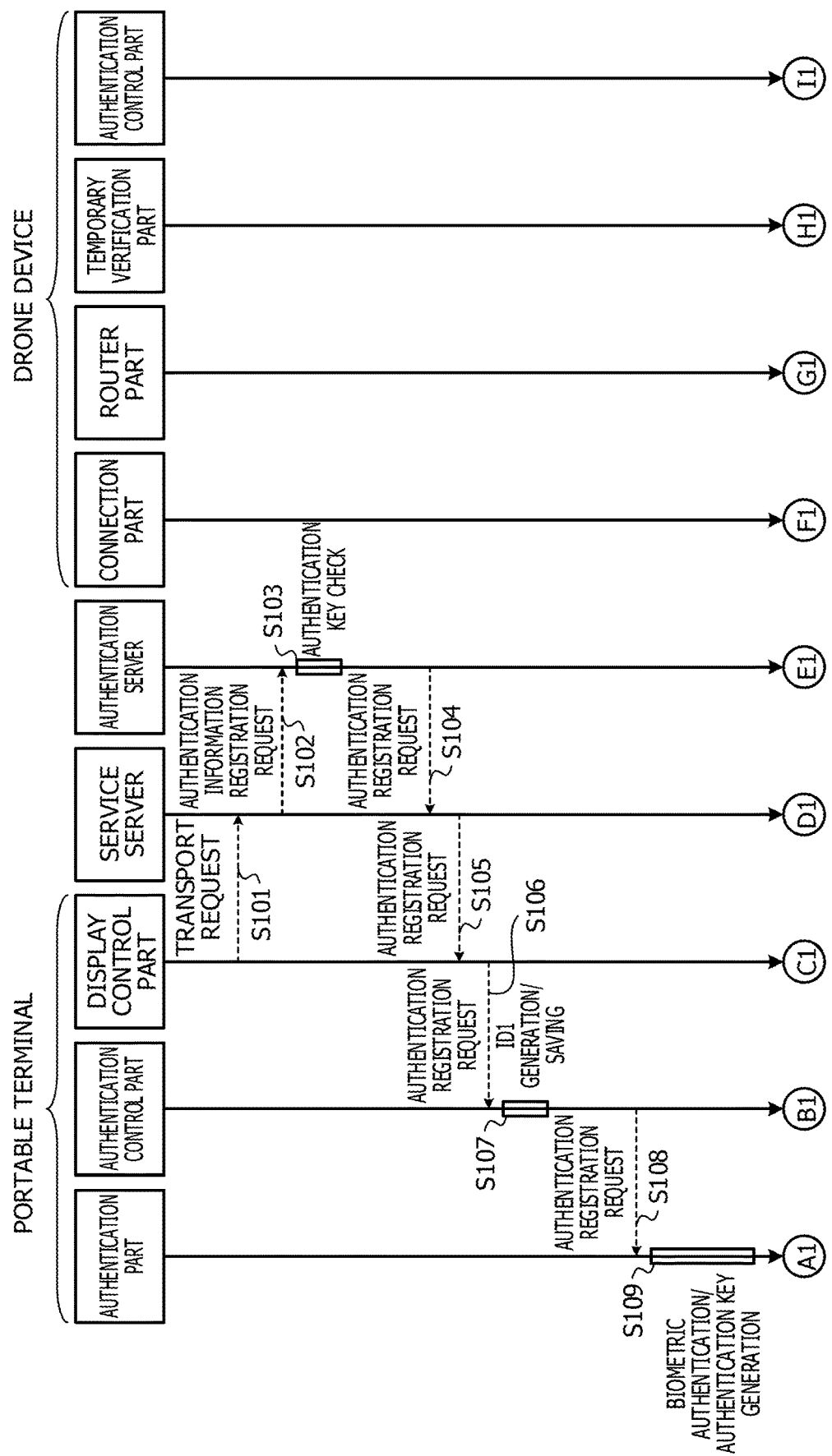
FIG. 11 is a processing sequence diagram (Part 1) illustrating an example of processing at request of transport.
Figure 12:
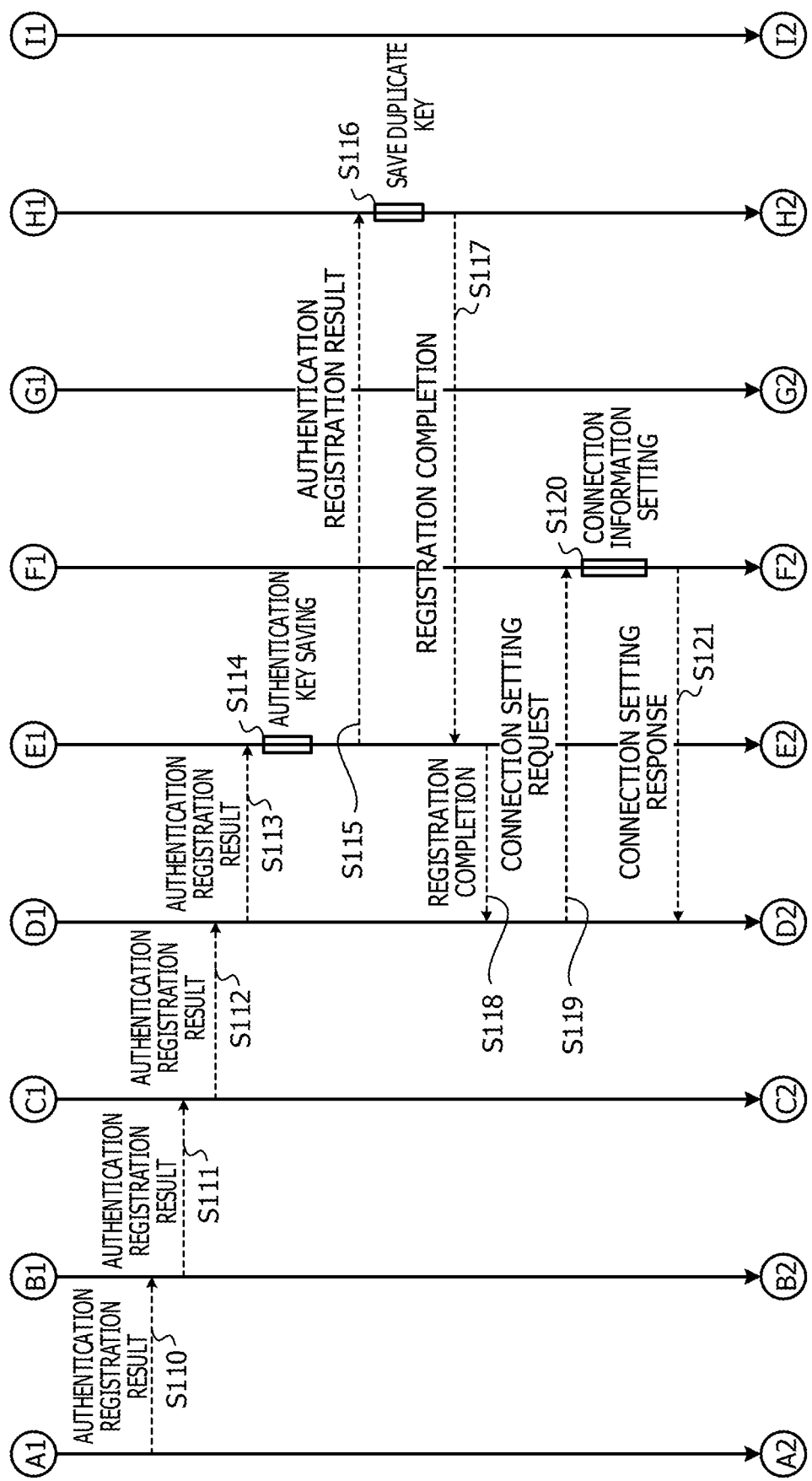
FIG. 12 is a processing sequence diagram (Part 2) illustrating an example of processing at request of transport.
Figure 13:
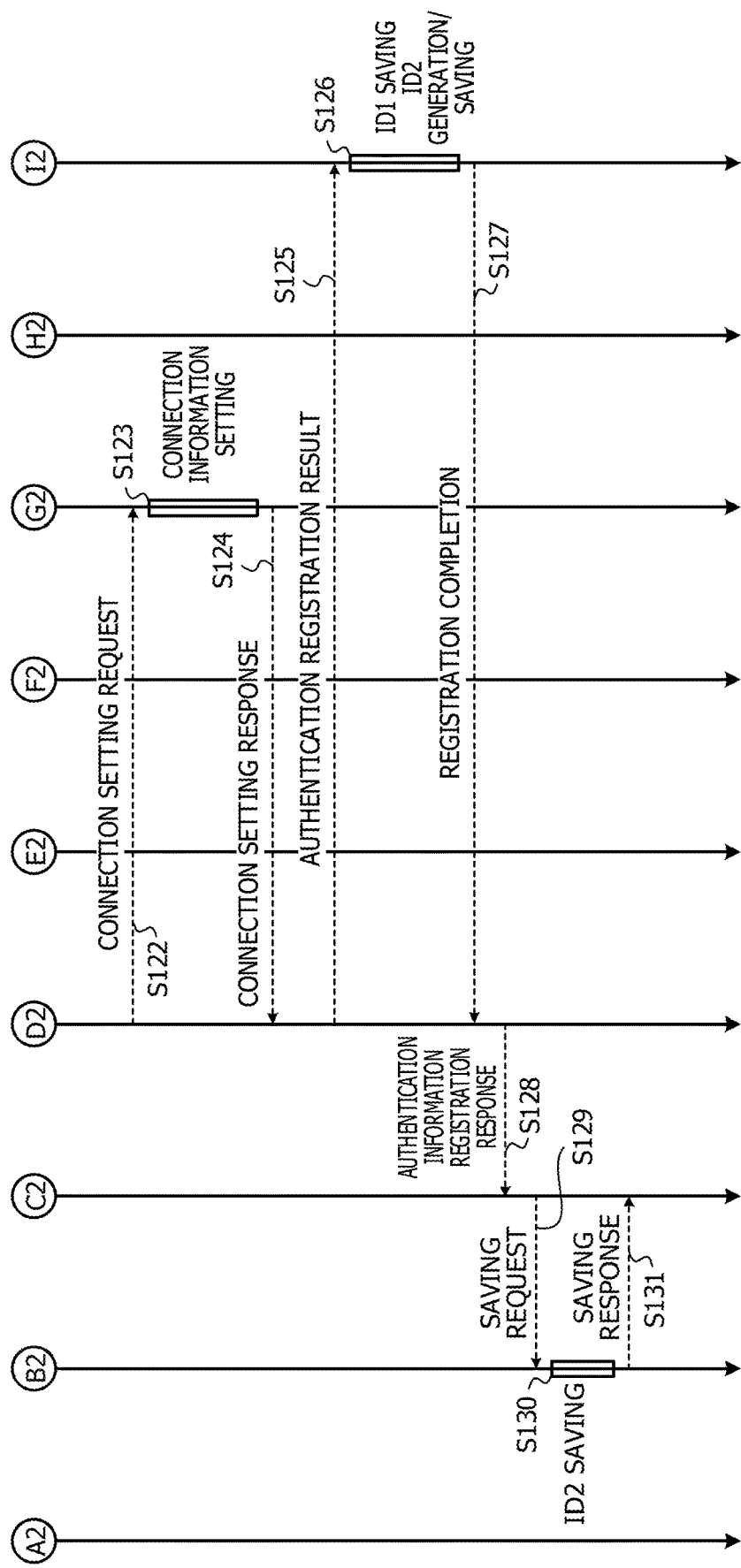
FIG. 13 is a processing sequence diagram (Part 3) illustrating an example of processing at request of transport.

FIG. 11 is a processing sequence diagram (Part 1) illustrating an example of processing at request of transport. FIG. 12 is a processing sequence diagram (Part 2) illustrating an example of processing at request of transport. FIG. 13 is a processing sequence diagram (Part 3) illustrating an example of processing at request of transport. FIGS. 14A to 14D are an example of the screen displayed on the portable terminal 100 at request of transport. FIGS. 11 to 13 are continuous using corresponding signs such as "A1".

Figure 14A:
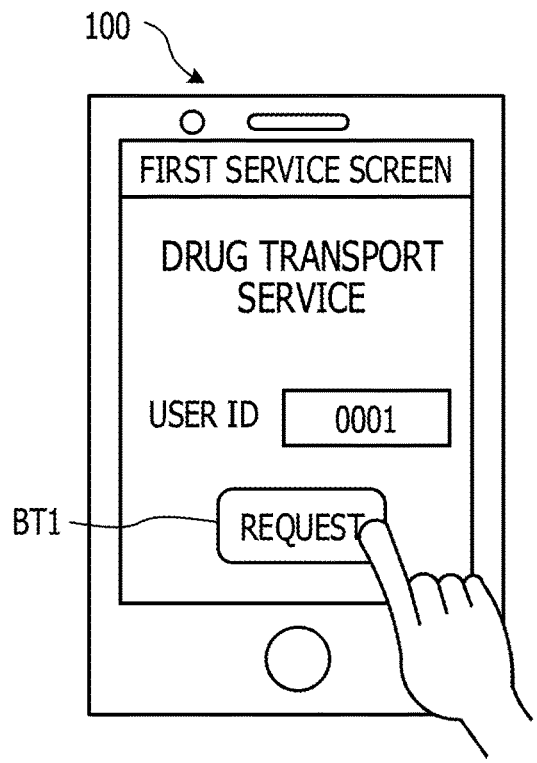
FIGS. 14A to 14D are views illustrating an example of a screen displayed on the portable terminal at request of transport.

First, as illustrated in FIG. 11, the display control part 102 of the portable terminal 100 transmits a transport request to the service server 200 (Step S101). Describing in more detail, when the user 10 operates the touch panel 100H (see FIG. 3) to activate the service application, the display control part 102 accesses the service provision part 202 of the service server 200 via the wide-area communication part 101. Then, the display control part 102 acquires the first Web page for starting the drug transport service from a plurality of Web pages managed by the service provision part 202 via the wide-area communication part 101, and displays the first service screen corresponding to the first Web page on the display 100I (see FIG. 3). Thereby, as illustrated in FIG. 14A, the portable terminal 100 displays the first service screen.

Figure 14B:
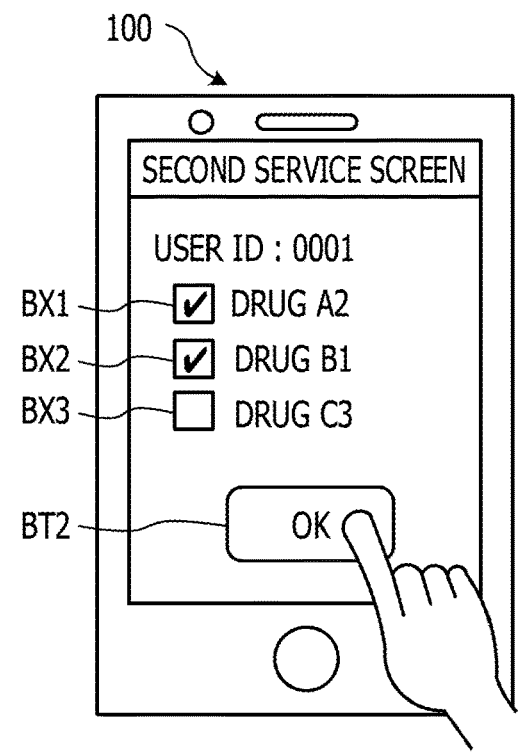

When the user 10 operates the first service screen to input the user ID and press a request button BT1, the display control part 102 again accesses the service provision part 202 of the service server 200 using the user ID inputted via the wide-area communication part 101. Then, the display control part 102 acquires the second Web page for selecting drugs from a plurality of Web pages managed by the service provision part 202 via the wide-area communication part 101, and displays the second service screen corresponding to the second Web page on the display 100I (see FIG. 3). Thereby, as illustrated in FIG. 14B, the portable terminal 100 displays the second service screen.

The second service screen includes the user ID inputted to the first service screen, and a plurality of check boxes BX1, BX2, and BX3 for selecting drugs to be transported. When the user 10 checks at least one of the plurality of check boxes BX1, BX2, and BX3 and presses an OK button BT2, the display control part 102 transmits a transport request to the service server 200 via the wide-area communication part 101. The transport request includes the user ID and the name of the selected drug. Accordingly, for example, as illustrated in FIG. 14B, when drugs "drug A2" and "drug C3" are selected, the transport request includes the user ID, the drug A2 and the drug C3.

When the processing in Step S101 is completed, the service server 200 transmits the authentication information registration request to the authentication server 300 (Step S102). Describing in more detail, the service provision part 202 of the service server 200 waits for a request from the display control part 102. Then, when the received request is the transport request, the service provision part 202 searches the user information storage part 203 based on the user ID included in the transport request. When identifying user information including the user ID included in the transport request, the service provision part 202 associates the identified user information with the drug name included in the transport request and saves them. The service provision part 202 saves the drug name and then, transmits the authentication information registration request including the user ID and the URL of the service server 200 to the authentication server 300 via the communication part 201.

When the processing in Step S102 is completed, the authentication server 300 checks the authentication key (Step S103), and transmits the authentication registration request to the service server 200 (Step S104). Describing in more detail, the verification part 302 of the authentication server 300 waits for the request from the service provision part 202. Then, when the received request is the authentication information registration request, the verification part 302 extracts the user ID from the authentication information registration request, and determines whether or not information (hereinafter referred to as entry) including the user ID common to the extracted user ID is present in the public key storage part 303 to check the presence of absence of the authentication key. When determining that the entry including the user ID common to the extracted user ID is not present, the verification part 302 generates a new entry including the extracted user ID, and saves the generated entry in the public key storage part 303. After that, the verification part 302 transmits the authentication registration request including the user ID and the application ID represented by the URL of the service server 200 to the service server 200 via the communication part 301.

When the processing in Step S104 is completed, the service server 200 transmits the authentication registration request to the display control part 102 (Step S105). Describing in more detail, the service provision part 202 of the service server 200 waits for a response to the authentication information registration request transmitted by itself, and when the response is the authentication registration request, transmits the authentication registration request to the display control part 102 via the communication part 201.

When the processing in Step S105 is completed, the display control part 102 transmits the authentication registration request to the authentication control part 103 (Step S106). Describing in more detail, the display control part 102 waits a response to the transport request transmitted by itself, and when the response is the authentication registration request, transmits the authentication registration request to the authentication control part 103. When the authentication registration request includes information for generating a predetermined screen to notify the start of the authentication registration request to the user 10, before transmitting the authentication registration request to the authentication control part 103, the display control part 102 may display the predetermined screen on the display 100I (see FIG. 3) based on the information.

When the processing in Step S106 is completed, the authentication control part 103 generates the first identification information and saves the generated first identification information in the ID storage part 106 (Step S107). Describing in more detail, the authentication control part 103 waits for the request from the display control part 102. Then, when the received request is the authentication registration request, the authentication control part 103 generates the first identification information, extracts the application ID from the authentication registration request, associates the generated first identification information with the extracted application ID, and saves them in the ID storage part 106. Thereby, the ID storage part 106 stores a combination of the first identification information and the application ID (see FIG. 7A). At this time, the combination of the first identification information and the application ID is not associated with the second identification information.

When the processing in Step S107 is completed, the authentication control part 103 transmits the authentication registration request to the authentication part 104 (Step S108). Describing in more detail, the authentication control part 103 transmits the authentication registration request including the generated first identification information, the application ID, and the user ID. The authentication control part 103 transmits the authentication registration request and then, waits for a response from the authentication part 104.

When the processing in Step S108 is completed, the authentication part 104 displays the biometric authentication screen, and generates the authentication key (Step S109). Describing in more detail, the authentication part 104 waits for a request. Then, when the received request is the authentication registration request, the authentication part 104 displays the biometric authentication screen on the display 100I (see FIG. 3). Thereby, as illustrated in FIG. 14C, the portable terminal 100 displays the biometric authentication screen.

Figure 14C:
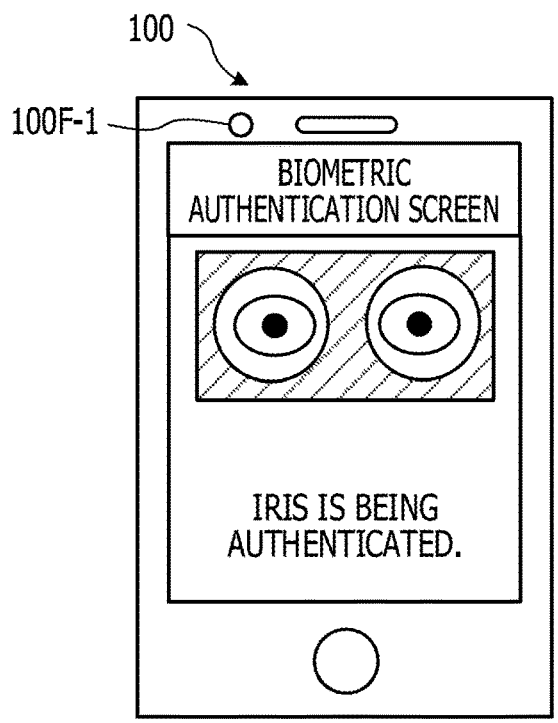

Here, when the user 10 directs his/her eyes to the biometric authentication sensor (for example, camera) 100E-1, as illustrated in FIG. 14C, the authentication part 104 displays the eyes of the user 10 on the biometric authentication screen of the portable terminal 100, and acquires the iris of the user 10 as the biometric information. The authentication part 104 compares the biometric information stored in itself with the acquired biometric information, and when the comparison of the two pieces of biometric information can authenticate the user 10, generates a pair of the secret key and the public key as the authentication key. After that, the authentication part 104 extracts the application ID included in the authentication registration request, associates the generated secret key with the application ID, and stores them in the secret key storage part 107. Thereby, the secret key storage part 107 associates the secret key with the application ID and stores them (see FIG. 7B).

Shifting to FIG. 12, when the processing in Step S109 is completed, the authentication part 104 transmits an authentication registration result to the authentication control part 103 (Step S110). Describing in more detail, the authentication part 104 generates an electronic signature generated by encoding the first identification information using the secret key, and transmits the authentication registration result including the generated electronic signature, the generated public key, and the user ID. The authentication part 104 transmits the authentication registration result and then, waits for a request.

When the processing in Step S110 is completed, the authentication control part 103 transmits the authentication registration result to the display control part 102 (Step S111). Describing in more detail, the authentication control part 103 determines whether or not the received response is the authentication registration result, and when the received response is the authentication registration result, transmits the authentication registration result. The authentication control part 103 transmits the authentication registration result and then, waits for a next request.

When the processing in Step S111 is completed, the display control part 102 transmits the authentication registration result to the service server 200 (Step S112). Describing in more detail, the display control part 102 determines whether or not the received response is the authentication registration result, and when received response is the authentication registration result, transmits the authentication registration result via the wide-area communication part 101. The authentication control part 103 transmits the authentication registration result and then, waits for a response from the service server 200.

When the processing in Step S112 is completed, the service server 200 transmits the authentication registration result to the authentication server 300 (Step S113). Describing in more detail, when the received request is the authentication registration result, the service provision part 202 of the service server 200 transmits the authentication registration result to the authentication server 300 via the communication part 201 and then, waits for a response from the authentication server 300.

When the processing in Step S113 is completed, the authentication server 300 saves the authentication key (Step S114). Describing in more detail, when the received request is the authentication registration result, the verification part 302 of the authentication server 300 extracts the user ID and the public key as the authentication key in the authentication registration result. Then, the verification part 302 searches the public key storage part 303 based on the extracted user ID, associates the entry including the extracted user ID with the extracted public key, and saves them in the public key storage part 303. The entry including the extracted user ID is generated by the processing in Step S103. Thereby, the public key storage part 303 stores the entry including a combination of the user ID and the public key (see FIG. 8B). At this time, the combination is not associated with the challenge.

When the processing in Step S114 is completed, the authentication server 300 transmits the authentication registration result to the temporary verification part 402 (Step S115). Describing in more detail, the verification part 302 of the authentication server 300 saves the public key as the authentication key and then, outputs the transmission instruction of the public key to the duplicate key transmission part 304. When the verification part 302 outputs the transmission instruction, the duplicate key transmission part 304 extracts the public key associated with the user ID included in the authentication registration result from the public key storage part 303, and duplicates the extracted public key. When duplicating the public key, the duplicate key transmission part 304 transmits the authentication registration result including the user ID and the duplicate key to the temporary verification part 402 of the drone device 400 via the communication part 301.

When the processing in Step S115 is completed, the temporary verification part 402 saves the duplicate key (Step S116) and then, transmits the registration completion to the authentication server 300 (Step S117). Describing in more detail, when receiving the authentication registration result via the near-field communication part 401, the temporary verification part 402 extracts the user ID and the duplicate key in the authentication registration result, associates the user ID with the duplicate key, and saves them in the duplicate key storage part 405. Thereby, the duplicate key storage part 405 stores a combination of the user ID and the duplicate key (see FIG. 9A). At this time, the combination is not associated with the challenge. When the processing in Step S116 is completed, the temporary verification part 402 transmits the registration completion of the authentication registration result to the authentication server 300.

When the processing in Step S117 is completed, the authentication server 300 transmits the registration completion to the service server 200 (Step S118). Describing in more detail, when the duplicate key transmission part 304 of the authentication server 300 receives the registration completion from the communication part 301, the duplicate key transmission part 304 transmits the registration completion of the authentication registration result to the service provision part 202 via the communication part 301.

When the processing in Step S118 is completed, the service server 200 transmits a connection setting request to the connection part 406 (Step S119). Describing in more detail, when the communication part 201 receives the registration completion, the service provision part 202 of the service server 200 generates the connection information, and transmits the connection setting request including the generated connection information to the connection part 406 via the communication part 201. The service provision part 202 transmits the connection setting request and then, waits for a connection setting response. The connection information includes SSID, passcode, expiration date, URL of the service server 200, IP address of the DHCP server, IP address of the default GW, and IP address of the DNS server.

When the processing in Step S119 is completed, the connection part 406 sets the connection information (Step S120). Describing in more detail, as illustrated in FIG. 10B, the connection part 406 holds the SSID, the passcode, and the expiration date in the connection information. Thereby, the connection information is set to the connection part 406. When the processing in Step S120 is completed, the connection part 406 transmits connection setting response to the service server 200 (Step S121).

Shifting to FIG. 13, when the processing in Step S121 is completed, the service server 200 transmits the connection setting request to the router part 407 (Step S122). Describing in more detail, when the communication part 201 receives a first connection setting response, the service provision part 202 of the service server 200 transmits the connection setting request including the connection information generated in the processing in Step S119 via the communication part 201. The service provision part 202 transmits the connection setting request and then, waits for a second connection setting response.

When the processing in Step S122 is completed, the router part 407 sets the connection information (Step S123). Describing in more detail, as illustrated in FIG. 10A, the router part 407 holds SSID, passcode, URL of the service server 200, and so on in the connection information. Thereby, the connection information is set to the connection part 406. When the processing in Step S123 is completed, the connection part 406 transmits the connection setting response to the service server 200 (Step S124).

When the processing in Step S124 is completed, the service server 200 transmits the authentication registration result to the authentication control part 409 (Step S125). Describing in more detail, the service provision part 202 of the service server 200 transmits the authentication registration result including the application ID, the public key, and the electronic signature to the authentication control part 409 via the communication part 201. The electronic signature included in the authentication registration result is the encoded first identification information. The service provision part 202 transmits the authentication registration result and then, waits for the registration completion.

When the processing in Step S125 is completed, the authentication control part 409 saves the first identification information, and generates and saves the second identification information (Step S126). Describing in more detail, when the near-field communication part 401 receives the authentication registration result, the authentication control part 409 extracts the electronic signature, the public key, and the application ID in the authentication registration result. When extracting the electronic signature and the public key, the authentication control part 409 decodes the electronic signature by using the public key. This restores the first identification information. When the first identification information is restored, the authentication control part 409 generates the second identification information, associates the generated second identification information and the decoded first identification information with the application ID, and saves them in the ID storage part 410. Thereby, the ID storage part 410 stores a combination of the application ID, the first identification information, and the second identification information (see FIG. 9B).

When the processing in Step S126 is completed, the authentication control part 409 transmits the registration completion to the service server 200 (Step S127). Describing in more detail, the authentication control part 409 transmits the registration completion including the application ID and the generated second identification information.

When the processing in Step S127 is completed, the service server 200 transmits an authentication information registration response to the display control part 102 (Step S128). Describing in more detail, when the communication part 201 receives the registration completion, the service provision part 202 of the service server 200 extracts the application ID and the second identification information in the registration completion, and transmits the authentication information registration response including the extracted application ID and the second identification information via the communication part 201.

When the processing in Step S128 is completed, the display control part 102 transmits a saving request of the second identification information to the authentication control part 103 (Step S129). Describing in more detail, when the wide-area communication part 101 receives the authentication information registration response, the display control part 102 extracts the application ID and the second identification information in the authentication information registration response, and transmits the saving request including the extracted application ID and the second identification information.

When the processing in Step S129 is completed, the authentication control part 103 saves the second identification information (Step S130). Describing in more detail, the authentication control part 103 extracts application ID and the second identification information in the saving request, and searches the ID storage part 106 based on the extracted application ID. Then, the authentication control part 103 associates the first identification information associated with the application ID common to the extracted application ID with the extracted second identification information, and saves them in the ID storage part 106. Thereby, the ID storage part 106 stores a combination of the application ID, the first identification information, and the second identification information (see FIG. 7A).

Figure 14D:
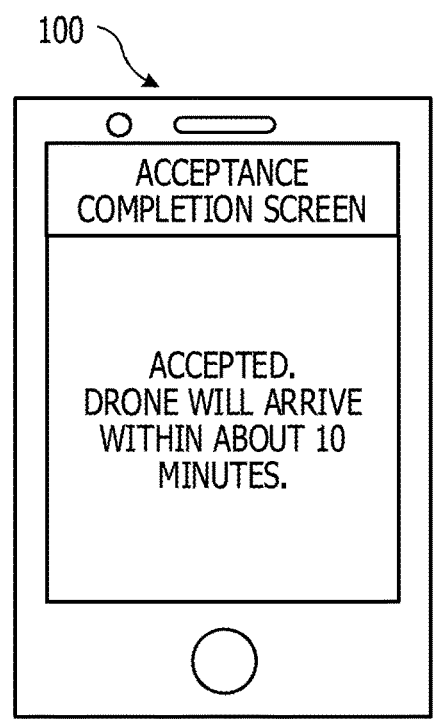

When the processing in Step S130 is completed, the authentication control part 103 transmits a saving response of the second identification information to the display control part 102 (Step S131). When receiving the saving response, the display control part 102 displays an acceptance completion screen on the display 100I. Thereby, as illustrated in FIG. 14D, the portable terminal 100 displays the acceptance completion screen. Meanwhile, the operator operates the drone device 400 to set the positional information of the user 10. The positional information of the user 10 may be acquired from the user information storage part 203 of the service server 200. When the operator instructs the drone device 400 to fly, the drone device 400 starts its flight to the set positional information as the destination.

Figure 15:
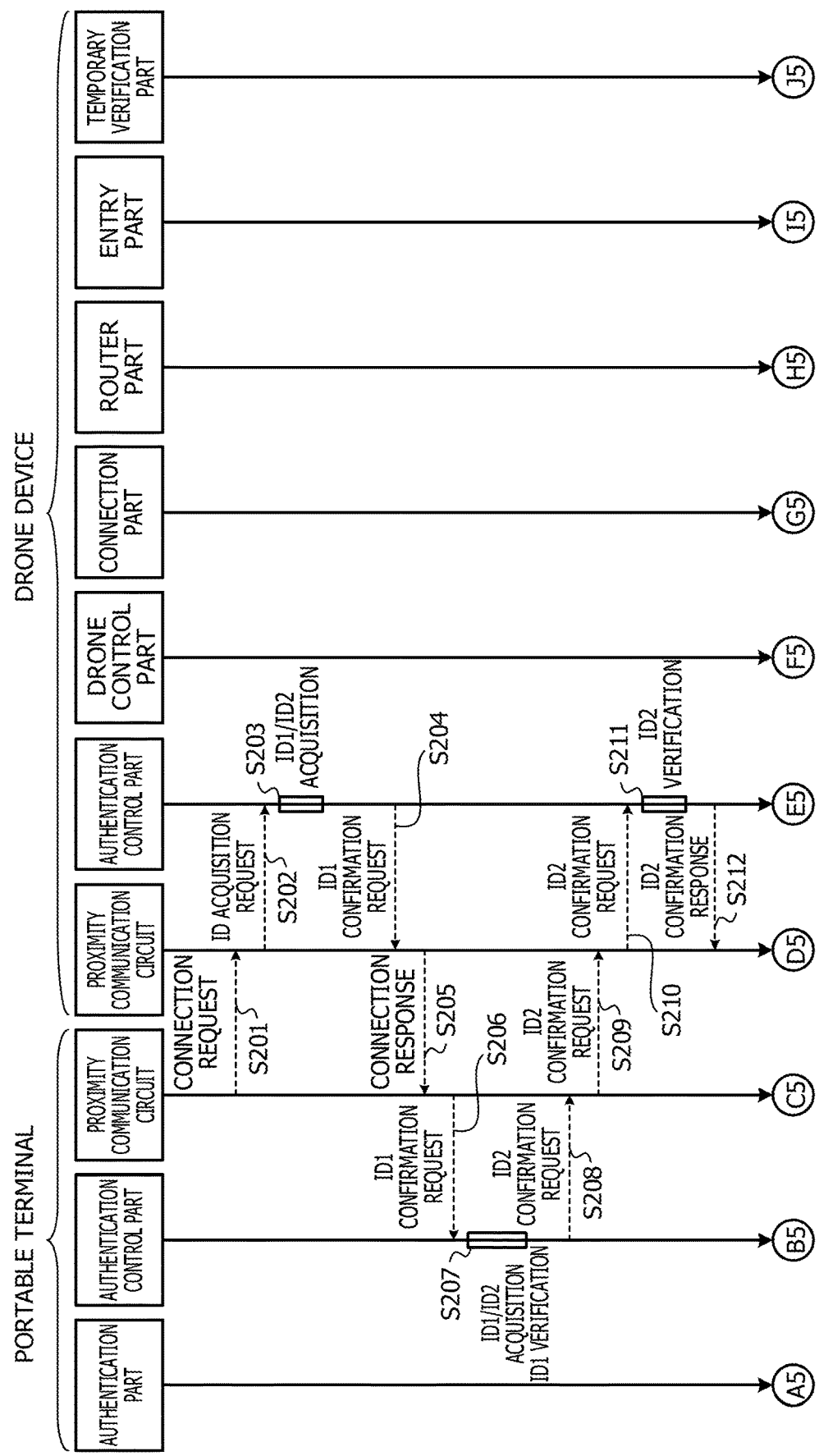
FIG. 15 is a processing sequence diagram (Part 1) illustrating an example of processing at authentication of the user.
Figure 16:
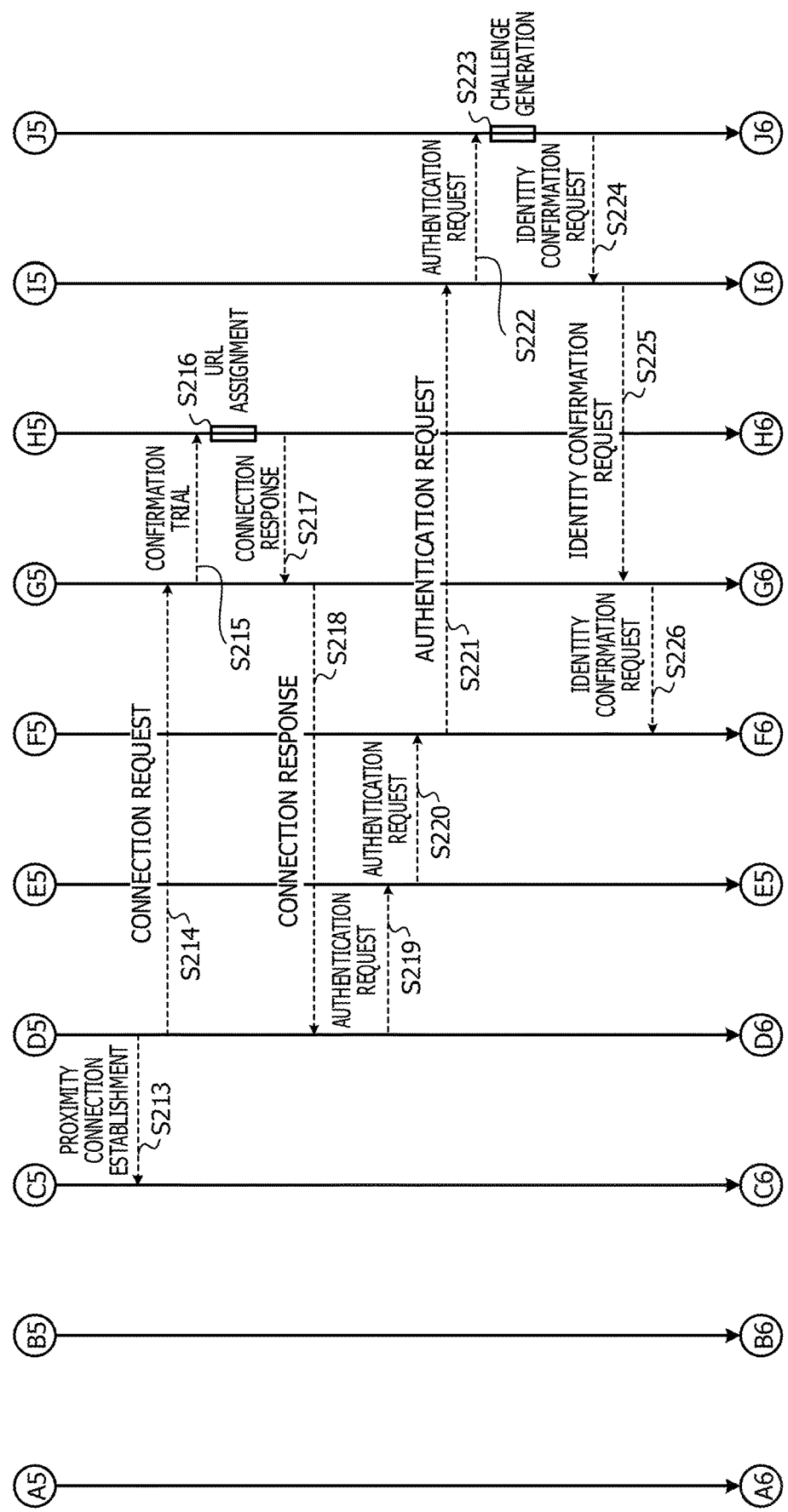
FIG. 16 is a processing sequence diagram (Part 2) illustrating an example of processing at authentication of the user.
Figure 17:
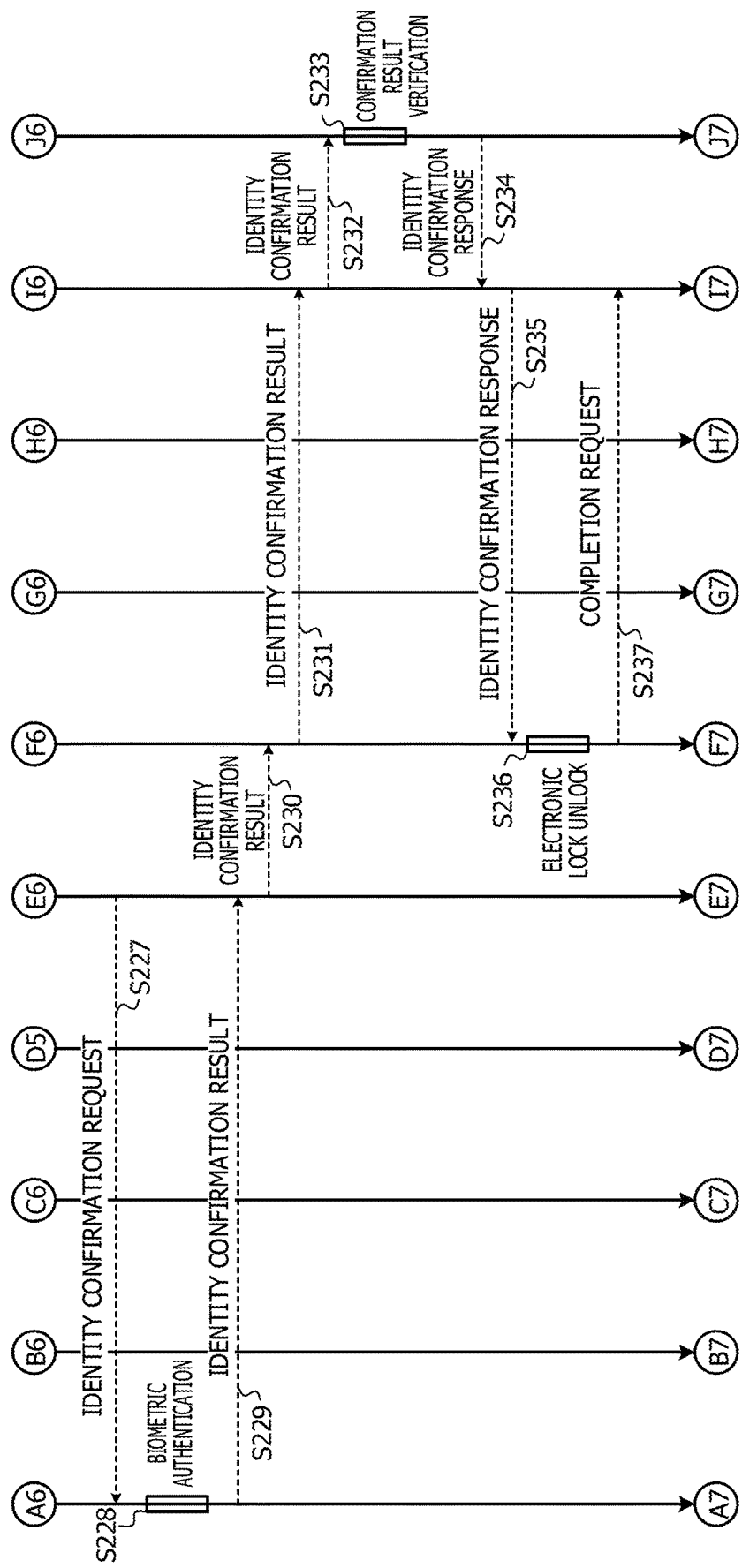
FIG. 17 is a processing sequence diagram (Part 3) illustrating an example of processing at authentication of the user.
Figure 18:
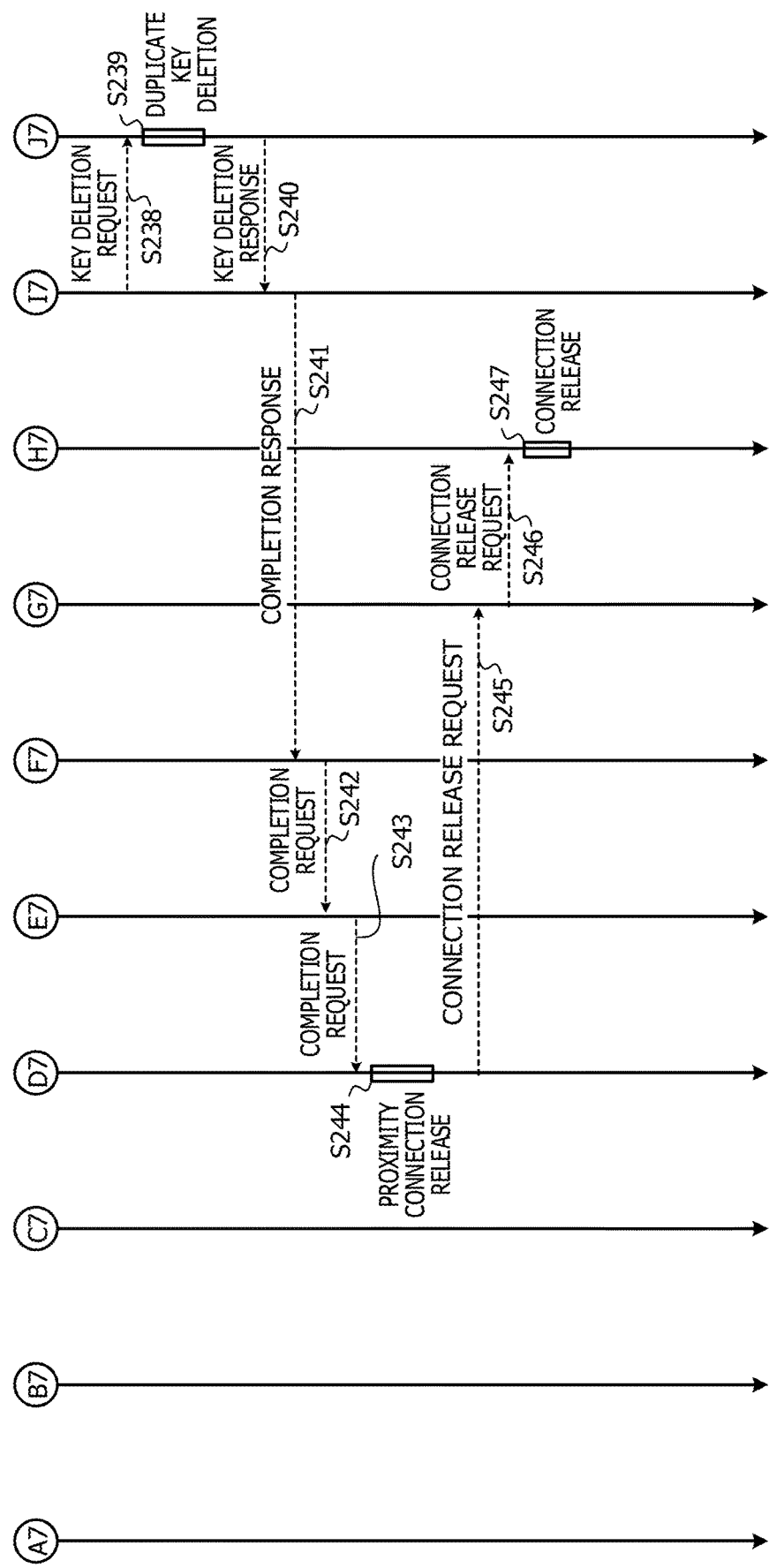
FIG. 18 is a processing sequence diagram (Part 4) illustrating an example of processing at authentication of the user.

FIG. 15 is a processing sequence diagram (Part 1) illustrating an example of processing at authentication of the user. FIG. 16 is a processing sequence diagram (Part 2) illustrating an example of processing at authentication of the user. FIG. 17 is a processing sequence diagram (Part 3) illustrating an example of processing at authentication of the user. FIG. 18 is a processing sequence diagram (Part 4) illustrating an example of processing at authentication of the user. FIGS. 19A to 19D illustrates an example of a screen displayed on the portable terminal 100 at authentication of the user. FIGS. 15 to 18 are continuous using corresponding signs such as "A5".

Figure 19A:
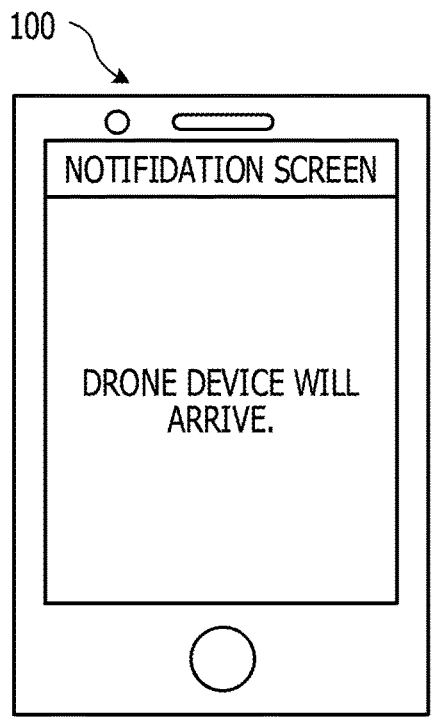
FIGS. 19A to 19D are views illustrating an example of the screen displayed on the portable terminal at authentication of the user.

First, as illustrated in FIG. 15, the proximity communication part 105 of the portable terminal 100 transmits a connection request to the proximity communication part 408 of the drone device 400 (Step S201). Describing in more detail, when detecting the arrival at the destination based on the positional information set to itself, the drone device 400 starts to descend. At completion of descent, the destination of electric power is switched. The service provision part 202 previously calculates a scheduled arrival time of the drone device 400, and when the current time coincides with the scheduled arrival time, notifies the arrival of the drone device 400 to the display control part 102. As a result, the display control part 102 displays a notification screen for notifying the arrival of the drone device 400 on the display 100I (see FIG. 3). Thereby, as illustrated in FIG. 19A, the portable terminal 100 displays the notification screen.

Figure 19B:
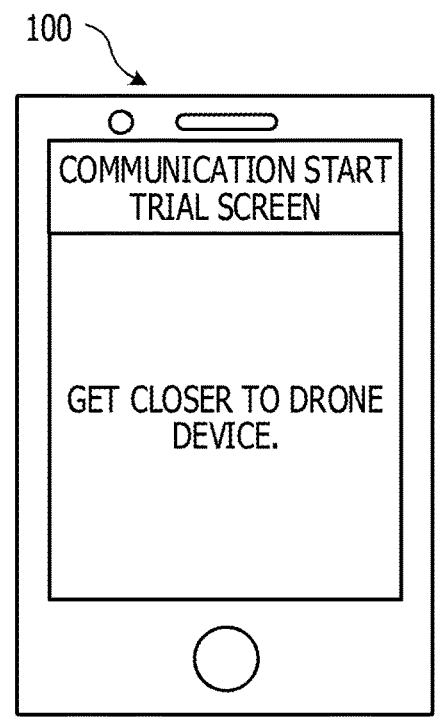

The display control part 102 displays the notification screen for a predetermined time and then, displays a communication trial start screen to prompt to bring the portable terminal 100 closer to the drone device 400 on the display 100I (see FIG. 3). Thereby, as illustrated in FIG. 19B, the portable terminal 100 displays the communication trial start screen. When the user 10 confirms the communication trial start screen, and brings the proximity communication part 105 of the portable terminal 100 closer to the proximity communication part 408 of the drone device 400, the proximity communication part 105 transmits the connection request including the user ID and the application ID to the proximity communication part 408 of the drone device 400, and tries to establish a communication channel.

When the processing in Step S201 is completed, the proximity communication part 408 transmits an ID acquisition request to the authentication control part 409 (Step S202). Describing in more detail, when receiving the connection request, the proximity communication part 408 extracts the application ID from the connection request, and transmits the ID acquisition request including the extracted application ID.

When the processing in Step S202 is completed, the authentication control part 409 acquires the first identification information and the second identification information (Step S203). Describing in more detail, when receiving the ID acquisition request, the authentication control part 409 searches the ID storage part 410 based on the application ID included in the ID acquisition request. The authentication control part 409 acquires the first identification information and the second identification information, which are associated with the application ID included in the ID acquisition request, from the ID storage part 410.

When the processing in Step S203 is completed, the authentication control part 409 transmits an ID1 confirmation request to the proximity communication part 408 (Step S204). Describing in more detail, the authentication control part 409 includes the application ID and the first identification information, and transmits the ID1 confirmation request including no second identification information. Until the reception of a below-mentioned ID2 confirmation request, the authentication control part 409 holds the second identification information.

When the processing in Step S204 is completed, the proximity communication part 408 transmits a connection response to the proximity communication part 105 (Step S205). Describing in more detail, when receiving the ID1 confirmation request, the proximity communication part 408 extracts the application ID and the first identification information in the ID1 confirmation request, and transmits the connection response including the extracted application ID and the first identification information. The connection response is a response to the connection request transmitted from the proximity communication part 105.

When the processing in Step S205 is completed, the proximity communication part 105 transmits the ID1 confirmation request to the authentication control part 103 (Step S206). Describing in more detail, when receiving the connection response, the proximity communication part 105 extracts the application ID and the first identification information in the connection response, and transmits the ID1 confirmation request including the extracted application ID and the first identification information.

When the processing in Step S206 is completed, the authentication control part 103 acquires the first identification information and the second identification information, and verifies the comparison result of the first identification information (Step S207). Describing in more detail, when receiving the ID1 confirmation request, the authentication control part 103 acquires the first identification information and the second identification information, which are associated with the application ID common to the application ID included in the ID1 confirmation request, from the ID storage part 106. Then, the authentication control part 103 compares the first identification information included in the ID1 confirmation request with the first identification information acquired from the ID storage part 106, and verifies a comparison result of the two pieces of first identification information.

When the processing in Step S207 is completed, the authentication control part 103 transmits the ID2 confirmation request to the proximity communication part 105 (Step S208). Describing in more detail, as the result of verification, when the two pieces of first identification information coincide with each other, the authentication control part 103 transmits the ID2 confirmation request including the application ID and the acquired second identification information.

When the processing in Step S208 is completed, the proximity communication part 105 transmits the ID2 confirmation request to the proximity communication part 408 (Step S209). When the processing in Step S209 is completed, the proximity communication part 408 transmits the authentication control part 409 to the ID2 confirmation request (Step S210).

When the processing in Step S210 is completed, the authentication control part 409 verifies a comparison result of the second identification information (Step S211). Describing in more detail, when receiving the ID2 confirmation request, the authentication control part 409 compares the second identification information included in the ID2 confirmation request with the second identification information held in the processing in Step S203 to verify a comparison result of the two pieces of second identification information.

When the processing in Step S211 is completed, the authentication control part 409 transmits an ID2 confirmation response to the proximity communication part 408 (Step S212). Describing in more detail, as the result of verification, when the two pieces of second identification information coincide with each other, the authentication control part 409 transmits the ID2 confirmation response. The ID2 confirmation response is a response indicating that the two pieces of second identification information coincide with each other, in response to the ID2 confirmation request.

Shifting to FIG. 16, when the processing in Step S212 is completed, the proximity communication part 408 establishes proximity connection to the proximity communication part 105 (Step S213). This establishes the communication channel between the proximity communication part 105 and the proximity communication part 408, such that various information may be exchanged.

When the processing in Step S213 is completed, the proximity communication part 408 transmits a connection request to the connection part 406 (Step S214). The connection request to transmit from the proximity communication part 408 to the connection part 406 is a request about a connection trial between the connection part 406 and the router part 407. When the processing in Step S214 is completed, the connection part 406 transmits the connection trial to the router part 407 (Step S215). Describing in more detail, when receiving the connection request, the connection part 406 transmits the connection trial including the SSID and the passcode, which are set to itself, to the router part 407.

When the processing in Step S215 is completed, the router part 407 assigns the URL (Step S216). Describing in more detail, when receiving the connection trial, the router part 407 extracts the SSID and the passcode in the received connection trial, and compares a combination of the extracted SSID and passcode with a combination of the SSID and the passcode set to itself. As the result of comparison, when the combinations coincide with each other, the router part 407 assigns the URL set to itself to the entry part 403. Thereby, the entry part 403 is represented as the service server 200 in a pseudo manner.

When the processing in Step S216 is completed, the router part 407 transmits the connection response to the connection part 406 (Step S217). The connection response transmitted from the router part 407 to the connection part 406 is a response indicating that connection between the connection part 406 and the router part 407 has succeeded and completed.

When the processing in Step S217 is completed, the connection part 406 transmits the connection response to the proximity communication part 408 (Step S218). When the processing in Step S218 is completed, the proximity communication part 408 transmits an authentication request to the authentication control part 409 (Step S219). The authentication request includes the user ID and the application ID. When the processing in Step S219 is completed, the authentication control part 409 transmits the authentication request to the drone control part 404 (Step S220).

When the processing in Step S220 is completed, the drone control part 404 transmits the authentication request to the entry part 403 (Step S221). Describing in more detail, the drone control part 404 transmits the authentication request including the URL of the connection destination, which is incorporated into itself. Here, the URL included in the authentication request indicates both of the service server 200 and the entry part 403. However, the drone device 400 may not be communicably connected to the communication network NW in the disaster area DA and this, may not communicate with the service server 200. Since the router part 407 may be communicably connected to the connection part 406, the drone control part 404 may transmit the authentication request to the connection part 406, causing the entry part 403 to receive the authentication request via the connection part 406 and the router part 407. In this manner, the drone control part 404 may indirectly transmit the authentication request to the entry part 403.

When the processing in Step S221 is completed, the entry part 403 transmits the authentication request to the temporary verification part 402 (Step S222). When the processing in Step S222 is completed, the temporary verification part 402 generates the challenge (Step S223). Describing in more detail, when receiving the authentication request, the temporary verification part 402 generates the challenge, and saves the challenge in the duplicate key storage part 405 (see FIG. 9A). In particular, since the duplicate key storage part 405 stores the duplicate key saved in the processing in Step S116, the temporary verification part 402 associates the challenge with the duplicate key stored in the duplicate key storage part 405, and saves the challenge.

When the processing in Step S223 is completed, the temporary verification part 402 transmits the identity confirmation request to the entry part 403 (Step S224). Describing in more detail, the temporary verification part 402 extracts the application ID included the authentication request, and transmits the identity confirmation request including the extracted application ID and the generated challenge. When the processing in Step S224 is completed, the entry part 403 transmits the identity confirmation request to the drone control part 404 (Step S225). Since the router part 407 is communicably connected to the connection part 406, the entry part 403 may indirectly transmit the identity confirmation request to the drone control part 404 by using communicative connection between the router part 407 and the connection part 406. When the processing in Step S225 is completed, the drone control part 404 transmits the identity confirmation request to the authentication control part 409 (Step S226).

Shifting to FIG. 17, when the processing in Step S226 is completed, the authentication control part 409 transmits the identity confirmation request to the authentication part 104 of the portable terminal 100 (Step S227). The identity confirmation request transmitted from the authentication control part 409 arrives at the authentication part 104 via the proximity communication part 408, and the proximity communication part 105 and the authentication control part 103 of the portable terminal 100. That is, the authentication control part 409 may indirectly transmit the identity confirmation request to the authentication part 104.

Figure 19C:
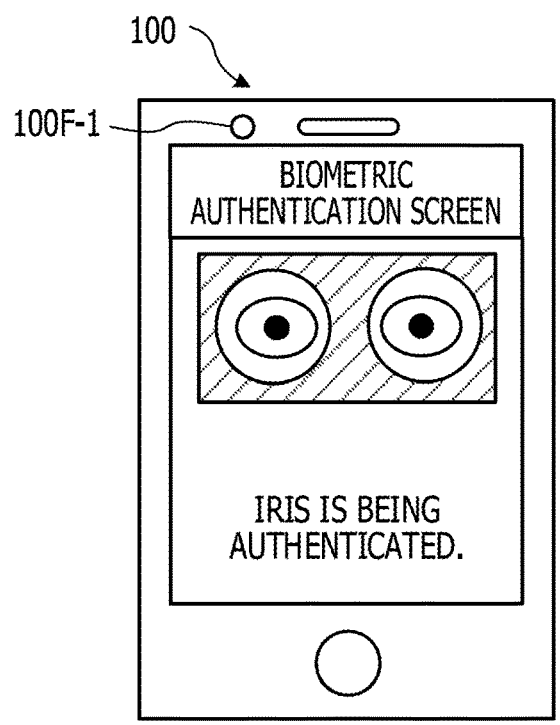

When the processing in Step S227 is completed, the authentication part 104 executes biometric authentication (Step S228). Describing in more detail, when receiving the identity confirmation request, the authentication part 104 displays the biometric authentication screen on the display 100I (see FIG. 3). Thereby, as illustrated in FIG. 19C, the portable terminal 100 displays the biometric authentication screen. When the user 10 directs his/her eyes to the biometric authentication sensor (for example, camera) 100E-1, the authentication part 104 displays the eyes of the user 10 on the biometric authentication screen of the portable terminal 100, and acquires the iris of the user 10 as the biometric information. The authentication part 104 compares the biometric information stored in itself with the acquired biometric information, and executes the biometric authentication.

When the processing in Step S228 is completed, the authentication part 104 transmits an identity confirmation result to the authentication control part 409 of the drone device 400 (Step S229). Describing in more detail, as the result of comparison of the two pieces of biometric information, when the identity of the user 10 is confirmed, the authentication part 104 extracts the challenge included in the identity confirmation request, and acquires the secret key corresponding to the application ID included in the identity confirmation request from the secret key storage part 107. After that, the authentication part 104 encodes the challenge using the secret key to generate the electronic signature. When generating the electronic signature, the authentication part 104 indirectly transmits the identity confirmation result including the generated electronic signature to the authentication control part 409.

When the processing in Step S229 is completed, the authentication control part 409 transmits the identity confirmation result to the drone control part 404 (Step S230). When the processing in Step S230 is completed, the drone control part 404 transmits the identity confirmation result to the entry part 403 (Step S231). Thereby, the drone control part 404 starts authentication of the user 10. When the processing in Step S231 is completed, the entry part 403 transmits the identity confirmation result to the temporary verification part 402 (Step S232).

When the processing in Step S232 is completed, the temporary verification part 402 verifies a confirmation result (Step S233). Describing in more detail, the temporary verification part 402 extracts the electronic signature included in the identity confirmation result, and acquires the duplicate key and the challenge from the duplicate key storage part 405. Then, the temporary verification part 402 decodes the electronic signature by using the duplicate key to restore the challenge, and compares the acquired challenge with the decoded challenge, verifying the confirmation result. Since the duplicate key is a duplicated public key, the electronic signature may be restored.

When the processing in Step S233 is completed, the temporary verification part 402 transmits an identity confirmation response to the entry part 403 (Step S234). Describing in more detail, as the result of the two challenges, when the identity of the user 10 is authenticated, the temporary verification part 402 indirectly transmits the identity confirmation response to the entry part 403. The identity confirmation response includes the success of authentication of the user 10.

Figure 19D:
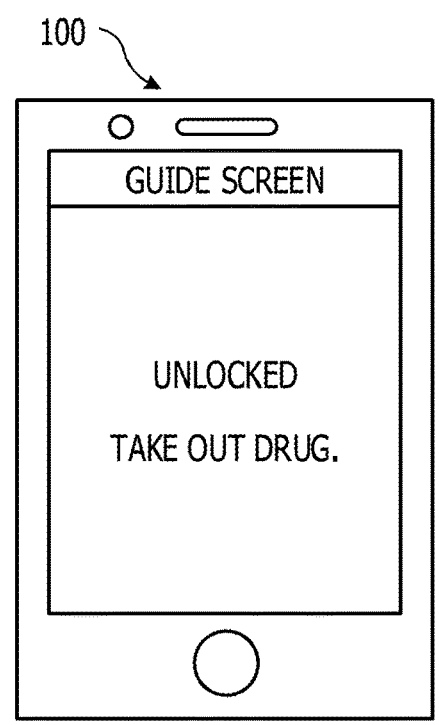

When the processing in Step S234 is completed, the entry part 403 transmits the identity confirmation response to the drone control part 404 (Step S235). When the processing in Step S234 is completed, the drone control part 404 unlocks the electronic lock 400E' (Step S236). Describing in more detail, when receiving the identity confirmation response, the drone control part 404 finishes authentication of the user 10. When unlocking the electronic lock 400E', the drone control part 404 transmits a guidance notification notifying the completion of unlocking of the electronic lock 400E' to the display control part 102. When receiving the guidance notification, the display control part 102 displays a guidance screen on the display 100I (see FIG. 3). Thereby, as illustrated in FIG. 19D, the portable terminal 100 displays the guidance screen. Accordingly, the user 10 may check the guidance screen to take out the drug from the transport box 450. When the processing in Step S236 is completed, the drone control part 404 transmits a completion request to the entry part 403 (Step S237).

Shifting to FIG. 18, when the processing in Step S237 is completed, the entry part 403 transmits a key deletion request to the temporary verification part 402 (Step S238). When the processing in Step S238 is completed, the temporary verification part 402 deletes the duplicate key (Step S239). Describing in more detail, the temporary verification part 402 deletes the user ID, the expiration date, and the challenge that are associated with the duplicate key and the duplicate key, which are stored in the duplicate key storage part 405. Thereby, the authentication function of the user 10 disappears from the drone device 400.

When the processing in Step S239 is completed, the temporary verification part 402 transmits a key deletion response to the entry part 403 (Step S240). When the processing in Step S240 is completed, the entry part 403 transmits a completion response to the drone control part 404 (Step S241). When the processing in Step S241 is completed, the drone control part 404 transmits the completion request to the authentication control part 409 (Step S242). When the processing in Step S242 is completed, the authentication control part 409 transmits the completion request to the proximity communication part 408 (Step S243).

When the processing in Step S243 is completed, the proximity communication part 408 releases proximity connection (Step S244). As a result, communication between the proximity communication part 408 and the proximity communication part 105 is shut off. When the processing in Step S244 is completed, the proximity communication part 408 transmits a connection release request to the connection part 406 (Step S245).

When the processing in Step S245 is completed, the connection part 406 transmits the connection release request to the router part 407 (Step S246). The connection part 406 transmit the connection release request to stop connection to the router part 407. When the processing in Step S246 is completed, the router part 407 releases the connection (Step S247). Describing in more detail, when receiving the connection release request, the router part 407 releases the connection to the connection part 406.

When the processing in Step S247 is completed, the drone control part 404 controls a completion button (not illustrated) of the drone device 400 from an impressable state to a pressable state. When the user 10 presses the completion button, the drone control part 404 checks locking of the electronic lock 400E' and then, switches the destination of electric power from the open-close switch 400E to the drive circuit 400G. After that, the drone device 400 takes off the ground, and returns to the service station SB.

In this embodiment, the state of communication between the drone device 400 and the authentication server 300 varies. Then, the drone device 400 includes the duplicate key storage part 405. The authentication server 300 transmits the duplicate key to the drone device 400 in a first communication state in which the drone device 400 may communicate with the authentication server 300, such that the duplicate key storage part 405 stores the duplicate key. The duplicate key is formed by duplicating the public key held by the authentication server 300, which corresponds to the secret key held by the portable terminal 100 of the user 10.

The drone device 400 includes the temporary verification part 402 and the drone control part 404. When the drone device 400 communicates with the portable terminal 100 in a second communication state in which the drone device 400 is not communicable with the authentication server 300, the temporary verification part 402 transmits the challenge to the portable terminal 100. When the portable terminal 100 receives the electronic signature formed by encoding the challenge based on the secret key, the temporary verification part 402 decodes the electronic signature based on the duplicate key. The temporary verification part 402 decodes the electronic signature, such that the drone control part 404 authenticates the user 10. Accordingly, the drone device 400 may authenticate the user 10 even in the state the drone device 400 may not communicate with the authentication server 300.

Although the preferred embodiment of the present disclosure has been described in detail, the present disclosure is not limited to a particular embodiment and may be modified and changed within the scope of the subject matter of the present disclosure, which is described in CLAIMS. For example, in place of the biometric authentication, personal identification number (PIN) may be used. In this case, the authentication device 100F stores a PIN input device and the PIN. In this case, the authentication part 104 displays a confirmation screen including a message to prompt PIN authentication in place of the biometric authentication screen.

Further, in the case where the temporary verification part 402 deletes the duplicate key of the duplicate key storage part 405 and then, the authentication result is stored in the duplicate key storage part 405 after authentication of the user 10 and the drone device returns from the disaster area DA to the service station SB, the authentication result stored in the duplicate key storage part 405 may be held in the authentication server 300. This may monitor the operating state of the drone device 400. At the timing when the drone device 400 may use the public wireless communication WL2, the temporary verification part 402 may allow the authentication server 300 to hold the authentication result.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authentication control device configured to be mounted over a mobile object, the authentication control device comprising:
    a communication circuit;
    one or more memories; and
    one or more processors coupled to the one or more memories, at least any one of the one or more processor being configured to:
    perform storing of a first authentication key received from a server device in any of the one or more memories, the first authentication key being a key relating to a second authentication key stored in a terminal of a user;
    in response to a signal indicating that the mobile object arrives at a predetermined location, activate the communication circuit from deactivated state;
    in response to receiving of a request signal from the terminal through the activated communication circuit, cause the activated communication circuit to transmit first information to the terminal;
    in response to transmitting of the first information, receive second information from the terminal through the activated communication circuit, the second information being the first information encoded in accordance with the second authentication key by the terminal configured to receive the first information from the authentication control device to generate the second information by encoding the received first information based on the second authentication key;
    in response to receiving of the second information, decode the received second information by the stored first authentication key; and
    execute an authentication process of the user by using the first information and information acquired by the decoding of the second information.

2. The authentication control device according to claim 1, wherein
    the storing of the first authentication key includes storing first identification information for identifying the terminal, the first identification information being received from the server device, and
    the receiving of the first information includes receiving other first identification information from the terminal.

3. The authentication control device according to claim 1, wherein
    the one or more processors are configured to
    generate second identification information for identifying the authentication control device,
    transmit the second identification information to the terminal via the server device, and
    in the communication between the authentication control device and the terminal in the state where the authentication control device is uncommunicable with the server device, transmit other second identification information to the terminal.

4. The authentication control device according to claim 1, wherein the authentication control device includes a drive device for moving.

5. The authentication control device according to claim 1, wherein
    the one or more processors are configured to, after the authentication process, when the authentication control device is communicable with the server device, transmit a result of the authentication process to the server device.

6. The authentication control device according to claim 1, wherein
    the authentication process is executed by a first processor among the one or more processors, and
    the first authentication key is received by a second processor among the one or more processors.

7. The authentication control device according to claim 6, wherein
    the first processor is detachable from the authentication control device.

8. An authentication control method executed by an authentication control device configured to be mounted over a mobile object, the authentication control method comprising:
    storing a first authentication key received from a server device in the authentication control device, the first authentication key being a key relating to a second authentication key stored in a terminal of a user; and
    in response to a signal indicating that the mobile object arrives at a predetermined location, activating a communication circuit of the authentication control device from deactivated state;
    in response to receiving of a request signal from the terminal through the activated communication circuit, causing the activated communication circuit to transmit first information to the terminal;
    in response to transmitting of the first information, receiving second information from the terminal through the communication circuit, the second information being the first information encoded in accordance with the second authentication key by the terminal configured to receive the first information from the authentication control device to generate the second information by encoding the received first information based on the second authentication key;
    in response to receiving of the second information, decoding the received second information by the stored first authentication key; and
    executing an authentication process of the user by using the first information and information acquired by the decoding of the second information.

9. The authentication control method according to claim 8, wherein
the storing of the first authentication key includes storing first identification information for identifying the terminal, the first identification information being received from the server device; and
the receiving of the first information includes receiving other first identification information from the terminal.

10. The authentication control method according to claim 8, comprising:
generating second identification information for identifying the authentication control device;
transmitting the second identification information to the terminal via the server device; and
in the communication between the authentication control device and the terminal in the state where the authentication control device is uncommunicable with the server device, transmitting other second identification information to the terminal.

11. The authentication control method according to claim 8, wherein the authentication control device includes a drive device for moving.

12. The authentication control method according to claim 8, comprising:
after the authentication process, when the authentication control device is communicable with the server device, transmitting a result of the authentication process to the server device.

13. The authentication control method according to claim 8, wherein
the authentication control device includes a first processor and a second processor,
the authentication process is executed by the first processor, and
the first authentication key is received by the second processor.

14. The authentication control method according to claim 13, wherein
the first processor is detachable from the authentication control device.

15. A non-transitory computer-readable medium storing a program for causing an authentication control device to perform processing, the authentication control device being configured to be mounted over a mobile object, the processing comprising:
storing a first authentication key received from a server device in the authentication control device, the first authentication key being a key relating to a second authentication key stored in a terminal of a user; and
in response to a signal indicating that the mobile object arrives at a predetermined location, activating a communication circuit of the authentication control device from deactivated state;
in response to receiving of a request signal from the terminal through the activated communication circuit, causing the activated communication circuit to transmit first information to the terminal;
in response to transmitting of the first information, receiving second information from the terminal through the activated communication circuit, the second information being the first information encoded in accordance with the second authentication key by the terminal configured to receive the first information from the authentication control device to generate the second information by encoding the received first information based on the second authentication key;
in response to receiving of the second information, decoding the received second information by the stored first authentication key; and
executing an authentication process of the user by using the first information and information acquired by the decoding of the second information.

* * * * *